(12) United States Patent
Aral et al.

(10) Patent No.: US 10,599,477 B1
(45) Date of Patent: *Mar. 24, 2020

(54) METHODS AND APPARATUS FOR COMMAND LIST PROCESSING IN PERFORMING PARALLEL IO OPERATIONS

(71) Applicant: DataCore Software Corporation, Fort Lauderdale, FL (US)

(72) Inventors: Ziya Aral, Fort Lauderdale, FL (US); Nicholas C. Connolly, Purley (GB); Robert Bassett, Pensacola, FL (US); Roni J. Putra, Pompano Beach, FL (US)

(73) Assignee: DataCore Software Corporation, Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/395,638

(22) Filed: Apr. 26, 2019

Related U.S. Application Data

(63) Continuation of application No. 15/601,319, filed on May 22, 2017, now Pat. No. 10,318,354.

(51) Int. Cl.
*G06F 9/48* (2006.01)
*G06F 3/06* (2006.01)
*G06F 9/50* (2006.01)

(52) U.S. Cl.
CPC .......... *G06F 9/5038* (2013.01); *G06F 9/5005* (2013.01); *G06F 3/061* (2013.01); *G06F 3/0659* (2013.01); *G06F 9/50* (2013.01)

(58) Field of Classification Search
CPC ................................. G06F 9/48; G06F 3/0601
See application file for complete search history.

(56) References Cited

U.S. PATENT DOCUMENTS

| | | | |
|---|---|---|---|
| 5,465,335 A | 11/1995 | Anderson | |
| 10,318,354 B1 * | 6/2019 | Aral | ...................... G06F 9/5038 |
| 2006/0179274 A1 | 8/2006 | Jones et al. | |
| 2011/0072211 A1 | 3/2011 | Duluk, Jr. et al. | |
| 2012/0180068 A1 | 7/2012 | Wein et al. | |
| 2013/0179486 A1 | 7/2013 | Lee et al. | |
| 2014/0123146 A1 | 5/2014 | Barrow-Williams et al. | |

* cited by examiner

*Primary Examiner* — David E Martinez
(74) *Attorney, Agent, or Firm* — Michael Best & Friedrich LLP

(57) ABSTRACT

Command list processing in performing parallel IO operations is disclosed. In one example, handling IO requests directed to an operating system having an IO scheduling component entails allocating a command to a thread in association with an IO request. The command is allocated from one of a plurality of command lists accessible in parallel, and the command is also linked to one of a plurality of active command lists that are accessible in parallel. The command lists can be arranged as per-CPU command lists, with each per-CPU command list corresponding to one of a plurality of CPUs on a multi-core processing platform on which the IO requests are processed. Similarly, each of the active command lists can respectively correspond to one of the plurality of CPUs on the multi-core processing platform. Per-volume queues can also be implemented for respective volumes presented to applications.

6 Claims, 24 Drawing Sheets

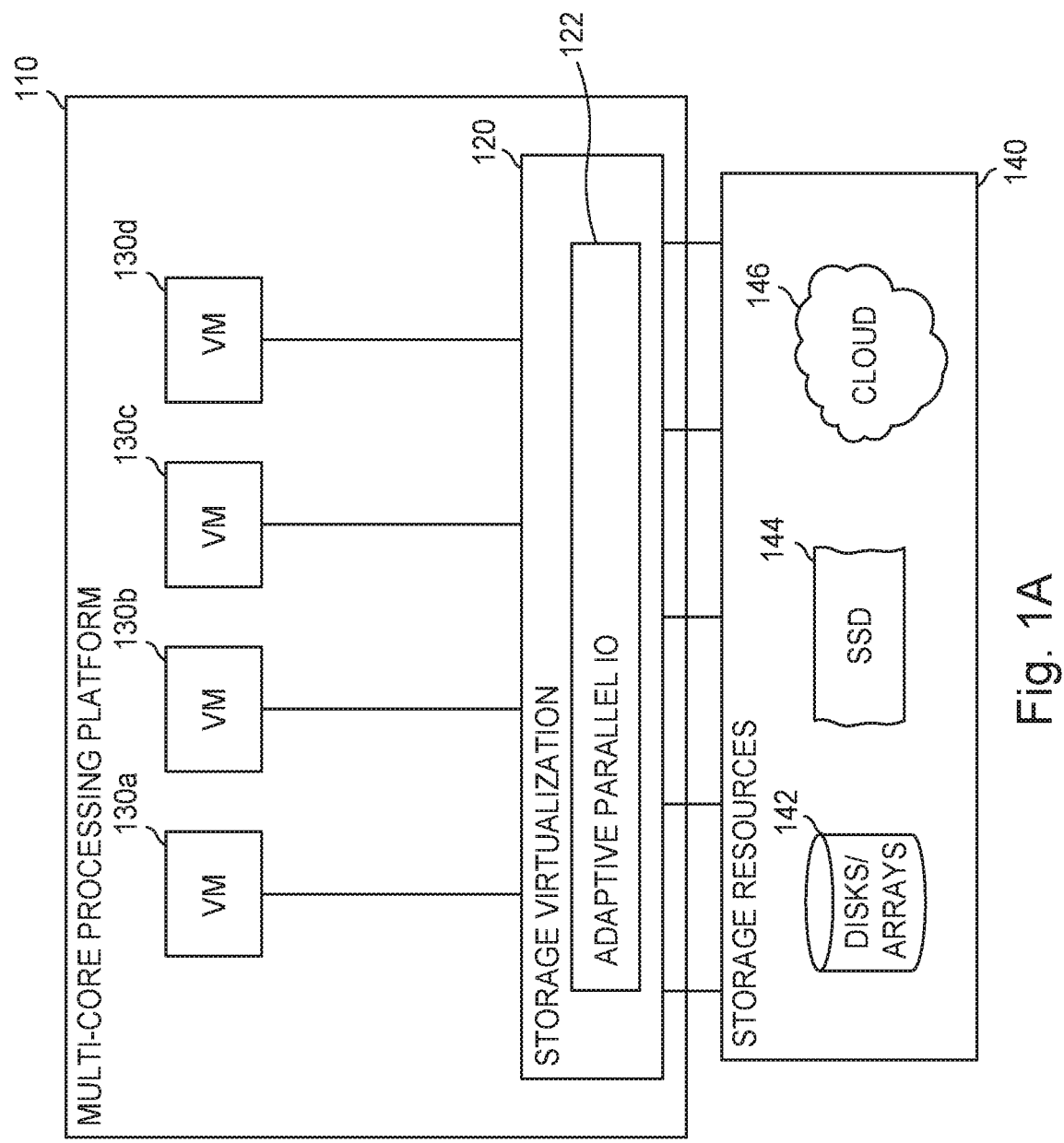

METHODS AND APPARATUS FOR COMMAND LIST PROCESSING IN PERFORMING PARALLEL IO OPERATIONS

CROSS-REFERENCE TO RELATED APPLICATIONS

This application is a Continuation of application Ser. No. 15/601,319, filed May 22, 2017, the contents of which are incorporated by reference herein in its entirety.

BACKGROUND OF THE INVENTION

Field of the Invention

This invention relates generally to storage virtualization, more particularly to executing IO requests in parallel, and still more particularly to managing parallel command lists in relation to executing the IO requests.

Description of the Related Art

What is needed is storage virtualization that performs IO operations in parallel, in particular in a multi-core processing environment. What is also needed is updating processes that support the performance of IO operations in parallel from typical sequential execution into parallel execution.

SUMMARY OF THE INVENTION

The embodiments of command list processing disclosed herein provide solutions for bottlenecks and contention that prevent multicore platforms realizing their full parallel processing potential.

In one example, handling IO requests directed to an operating system having an IO scheduling component entails allocating a command to a thread in association with an IO request. The command is allocated from one of a plurality of command lists accessible in parallel, and the command is also linked to one of a plurality of active command lists that are accessible in parallel. Upon a cache hit (or other immediate processing), a success indication can be returned to the thread, with the command being unlinked from its active command list and being freed to a command list.

The command lists can be arranged as per-CPU command lists, with each per-CPU command list corresponding to one of a plurality of CPUs on a multi-core processing platform on which the IO requests are processed. Similarly, each of the active command lists can respectively correspond to one of the plurality of CPUs on the multi-core processing platform.

In one example, each of the active command lists includes a cell, a singly linked list, and a doubly linked list. Under this arrangement, the command can be linked to the cell of the respective one of the active command lists using an interlocked compare exchange when the cell is available at the time of linking. Also, linking the command to the active command list can be firstly attempted against the cell, secondly against the singly linked list, and thirdly against the doubly linked list.

Per-volume queues can also be implemented for respective volumes presented to applications. There, the command is linked to the per-volume queue for the volume to which the IO request was directed. The per-volume queues are respectively configured to reference commands in relation to backend processing of IO requests, wherein each of the per-volume queues includes a doubly linked list and a singly linked list, the doubly linked list including commands linked to the respective per-volume queue, the singly linked list including commands whose removal from the respective per-volume queue is pending following completion of the backend processing.

BRIEF DESCRIPTION OF THE DRAWINGS

These and other more detailed and specific features of the present invention are more fully disclosed in the following specification, reference being had to the accompanying drawings, in which:

FIGS. 1A-B are block diagrams illustrating systems with storage virtualization with adaptive parallel IO.

DETAILED DESCRIPTION OF THE INVENTION

Figure 1B:
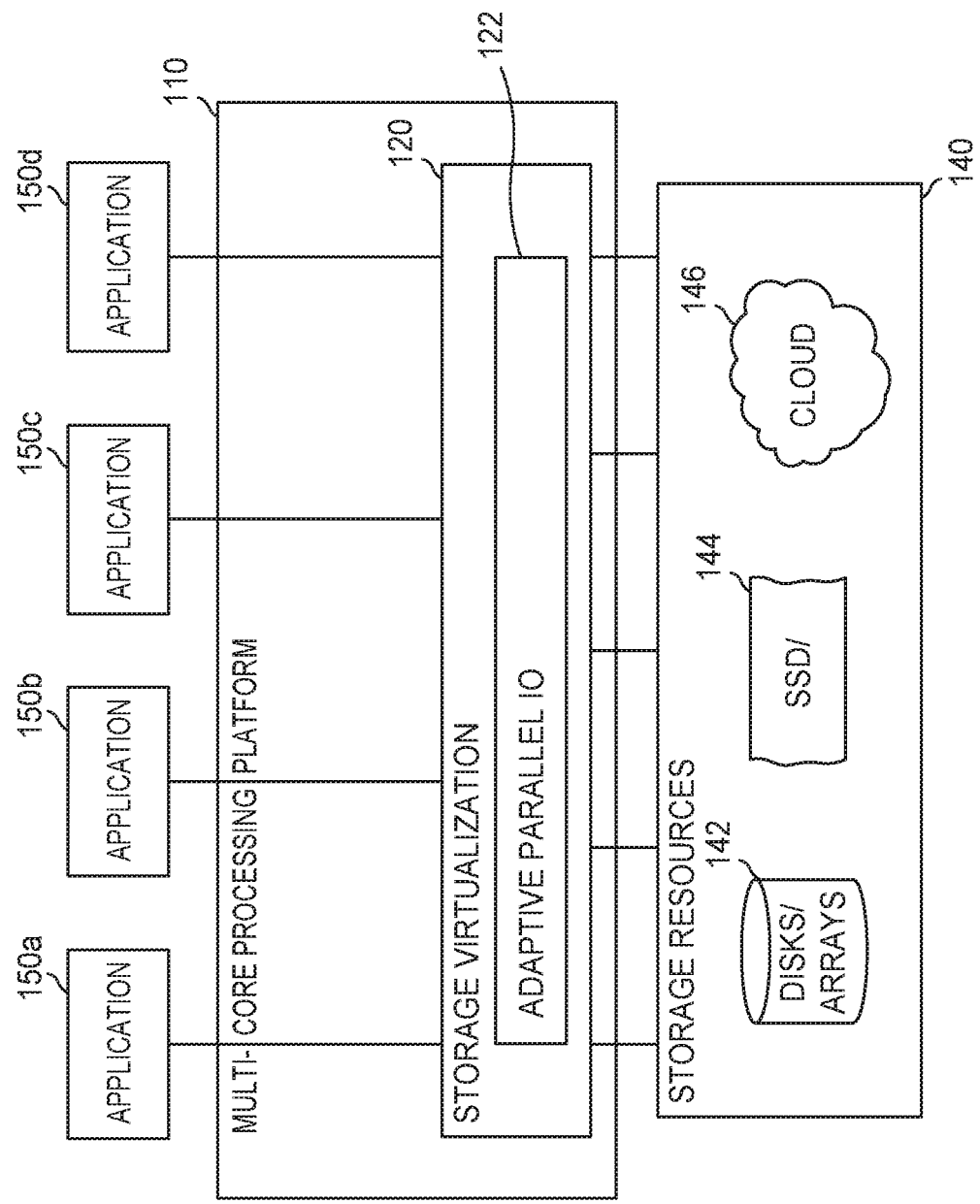

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

FIG. 1A is a block diagram illustrating a multi-core processing platform 110 configured to include a storage virtualization (SV) component 120 with an adaptive parallel IO (APIO) component 122. The multi-core processing platform 110 includes multiple cores (CPUs) that are configured to execute tasks in parallel. The SV component 120 provides traditional features such as the presentation of virtual disks to any number of virtual machines (VM 130a-d). The VMs 130a-d respectively direct IO requests to the presented virtual disks. The SV component 120 responds to these requests and manages underlying storage resources 140. The SV component 120 also provides a variety of conventional storage management facilities in relation to the presented virtual disks, including disk snapshots, disk mirroring, caching, etc.

The SV component 120 is configured to present the virtual disks to the VMs 130a-d, and to respond to IO requests in a fashion that allows the respective VMs 130a-d to merely "see" and interact with the disks, while the SV component 120 handles all of the underlying organization and management of storage operations and the corresponding management of the storage resources 140.

Multi-core processing is well known, and it is known to distribute processing tasks among respective CPUs. However, storage operations have continued to essentially operate serially. Even where multiple cores are available to execute storage operations, to ostensibly provide parallel processing, there remains a significant bottleneck in that storage operations are received and processed serially. That is, an IO handler typically processes all of the incoming IO requests from various requestors, and then sequences them accordingly. Even if the IO requests originate among multiple CPUs, the organization and performance of the IO requests within the operating system is still undertaken in essentially serial form. Problematic delay-causing IO requests are simply embedded among the tasked cores, so a variety of IO processing log jams remain present.

In one aspect, the embodiments described herein accommodate actual usage of the efficiencies of multicore architectures by changing the way IO scheduling is performed to maximize parallelism on a multicore platform. This, along with emulating block storage devices using software, CPU, storage devices, and RAM, creates the opportunity to complete most I/O requests in microseconds.

The APIO component 122 is configured to enable the execution of numerous IO request streams simultaneously in parallel among multiple CPUs. The APIO component 122 also adaptively invokes available CPUs into the IO request stream processing to dynamically make use of any available processing resources. Still further, the APIO component 122 filters IO requests so that immediately serviceable IO operations are processed in parallel, while (less frequent) delay-causing IO operations are forwarded for ordinary IO sequencing. Due to caching features in the SV component 120, the delay-causing IO operations are relatively small in number, so the APIO component 122 provides very significant increases in overall performance by allowing all of the other, relatively fast IO operations (i.e., the vast majority of IO operations) to essentially execute synchronously in parallel.

The adaptive parallel IO processing of the APIO component 122 is not limited to environments with virtual machines (or applications) co-resident on the multi-core processing platform. FIG. 1B illustrates an example where the APIO component 122 remains resident on the multi-core processing platform 110, but respective applications 150a-d reside elsewhere.

Figure 2A:
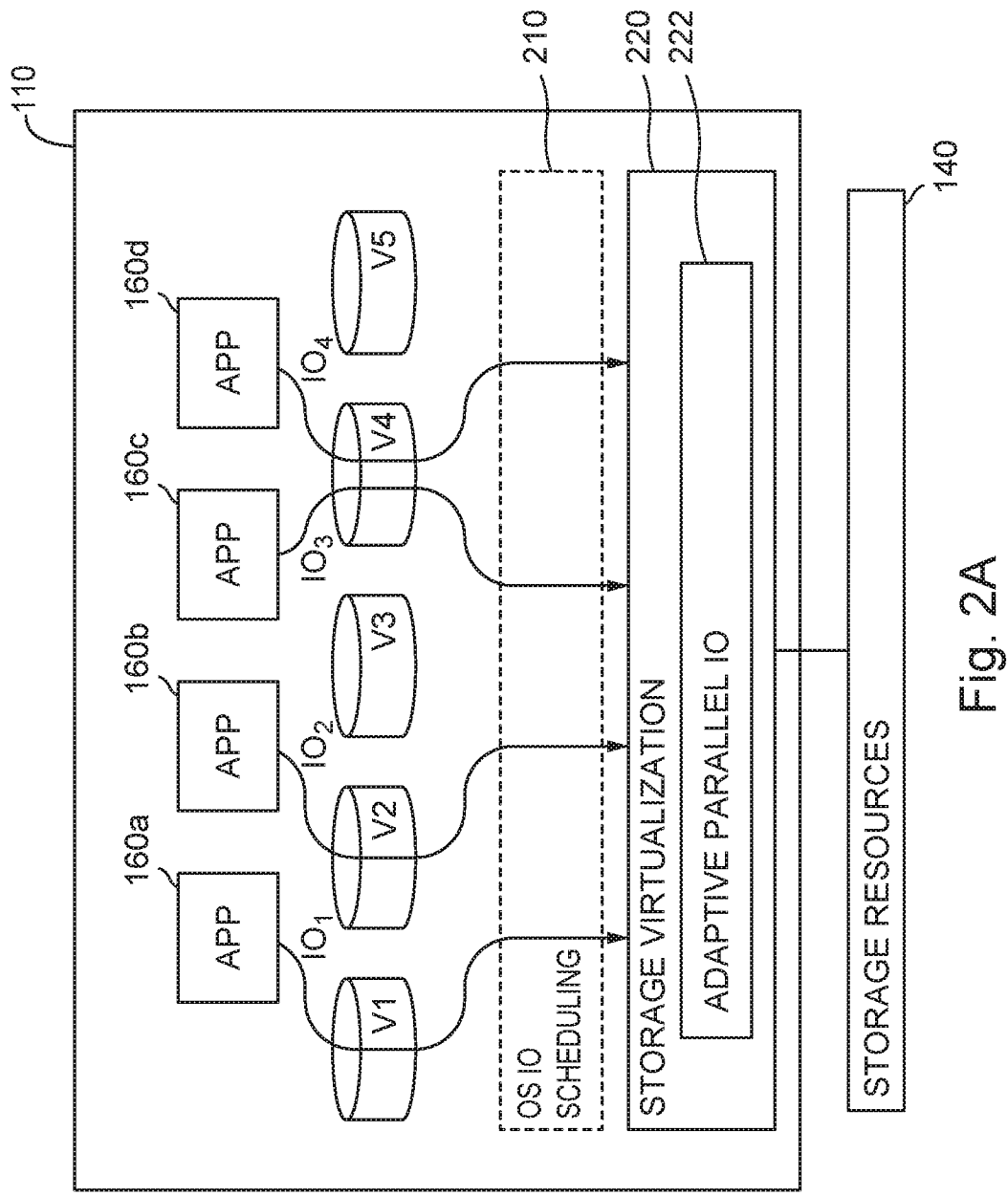
FIG. 2A-B are block diagrams illustrating an example of storage virtualization with adaptive parallel IO.

FIG. 2A is a block diagram illustrating an example of storage virtualization with an SV component 220 equipped to perform parallel bypass. In parallel bypass, IO requests are handled directly on application threads (e.g., IO1-IO4). As mentioned above, the SV component 220 presents virtual disks V1-V4 to various applications 160a-d. For example, a first application 160a may be presented a virtual disk V1, and may direct an IO request to that virtual disk V1 accordingly. An IO request may be a read or write operation, but may also be a control code.

Similarly, additional threads IO2-4 respectively correspond to other applications 160b-d. As evident from the figures, there is not necessarily a one-to-one correlation of applications to virtual disks. Thus two applications 160c-d may both be presented with a given virtual disk V4 and may direct IO requests accordingly.

In a conventional approach, IO requests are passed to an OS IO scheduling component, which receives and schedules IO requests while the applications wait for them to be completed and returned. Specifically, an application 160a-d makes an IO request and receives an acknowledgement through the OS that the IO request is pending. Meanwhile, the OS IO scheduling component queues the IO request in a different context. The IO request then progresses through the sequence of operating system layers for processing. Ultimately, the IO request is completed, the device interrupts the CPU, and a callback is made to the application to indicate completion of the IO request (e.g., in the original context to the application). This kind of loopback approach is repeatedly performed for each IO request. There is overhead associated with each request. In a parallel environment, this overhead increases nonlinearly, exacerbating latency and lengthening application response time greatly.

By contrast, the APIO component 222 receives the indication of IO requests before they pass under the control of the OS IO scheduling component. The APIO component 222 first receives the IO requests and determines whether the OS IO scheduling component can be bypassed. For example, the APIO component may bypass the operating system IO scheduling component in the event of a read that is a cache hit, or in the event of any optionally cached write operation. It may also bypass the operating system IO scheduling component based upon the availability of parallel processing resources, which in turn can be determined by the number of available CPUs, QOS determinations, and/or respective demand levels for IO requests and application task/function processing.

Figure 2B:
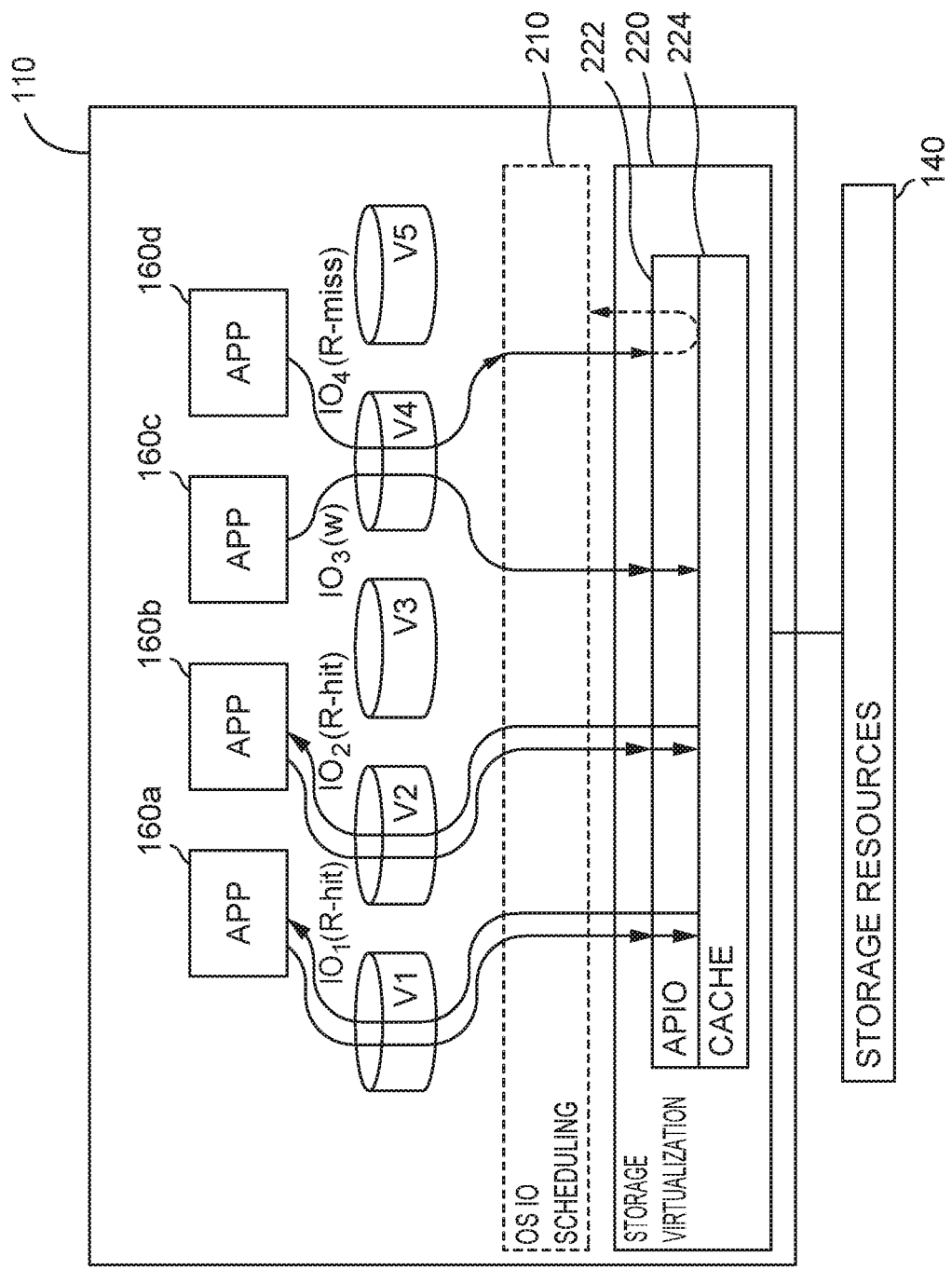

FIG. 2B illustrates the SV component 220 to include a disk block cache. It also illustrates various examples of threads IO1-IO4. By way of example, in the event of a read that is a cache hit (thread IO1 or IO2), the IO request is intercepted, the OS IO scheduling component is not invoked, and the read can be returned directly to the application without incurring a context change. In the event of a cached write operation, the write is immediately acknowledged to the application as successful, again with no OS IO sequencing and no context change. The cached write can be "dumped" into the SV component 220, which reconciles the actual writing of the data to storage resources 140 (and tracking for intervening reads). If desired, if a write queue starts to become overloaded, the OS IO sequencing component can be invoked to allow the write queue to be processed. Alternatively, additional parallel processing resources (e.g., more CPUs) can be invoked to handle times of high IO request demand. Essentially, the write therefore processes with the efficiency of a read cache hit. Finally, a cache miss (thread IO4) may be cycled back to OS IO scheduling 210. But even on a cache miss, the cache is updated to reflect the more recent data, expediting subsequent reads to that data. And still further, if desired and available, additional resources may also be used to handle a cache miss without having to loop back to the OS IO scheduling component, for example to read a high-speed NVMe device in polled mode, avoiding CPU interrupts. As such, the vast majority of IO requests are immediately processed and returned to the application successfully, without the context change or other delays typically introduced by OS IO scheduling 210.

With the APIO component 222, the processing of IO requests is as though the application threads have their data attached to them in a thread-local context. The requests are directly completed with function calls, without queuing, and without loopbacks and corresponding context switching. This avoids thrashing between IO scheduling threads and application threads, avoids device programming and subsequent CPU interrupts, and significantly improves the processing of IO requests in a multi-core environment.

Figure 3:
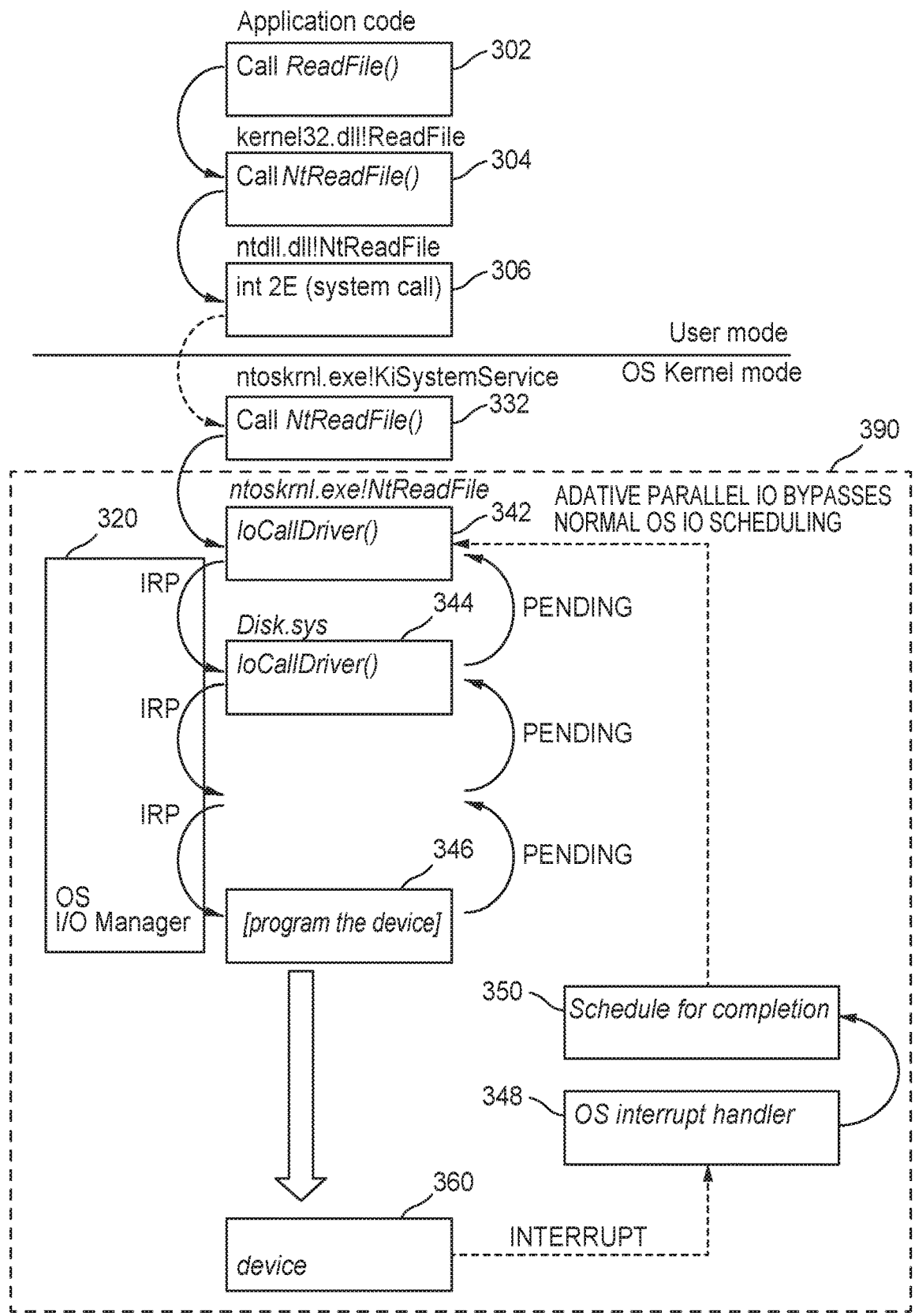
FIG. 3 is a block and flow diagram illustrating an example of OS IO scheduling that is bypassed in storage virtualization with adaptive parallel IO.

FIG. 3 is a block and flow diagram illustrating an example 300 of aspects of OS IO scheduling 390 that are bypassed using the SV component having an APIO component. Although one example of an OS is a Windows operating system, adaptive parallel IO as described herein is applicable to any OS.

It is useful to consider how a disk read operation is normally handled to appreciate how the APIO component avoids various latencies.

Any application may initiate an IO request in connection with an application thread, such as a read request (e.g., Call ReadFile( ) (302)). Following this, the application code transfers to the Win32 API NtReadFile (304). The application thread transfers to another Windows API, where it executes a system trap instruction (306).

The application thread then switches to kernel mode, so that it can execute in the trusted areas of the operating system normally off-limits from running applications. The trap handler sends the application thread to another NtReadFile in the kernel (332). At this stage, involvement of the Windows I/O Manager 320 for IO scheduling initiates. The IO scheduling that would normally be performed by the OS IO scheduling component is generally indicated by the dotted box 390 in FIG. 3. An initial aspect of this is that the app thread builds an I/O Request Packet (IRP), sets it up to target a disk object, and then carries it into the I/O Manager 320 (342).

In normal OS IO scheduling, by weaving in and out of the I/O Manager 320, the app thread carries the IRP down a series of layered drivers (e.g., 342, 344, 346, and so on). This "downward" progression continues until a bottom level driver (e.g., 346) determines that it is time to program an actual device 360 to get the data. The app thread executes driver code to program the device 360 (shown as downward arrow); for example, by interacting with a request queue exposed by the device in host shared memory. Notably, in a traditional arrangement, because storage responsiveness would be expected to be relatively long (e.g., millions of CPU cycles), the driver code sets up a callback and sends the app thread back up the stack of drivers to indicate a pending status. This theoretically would allow the operating system to reallocate the CPU to execute other application work, rather than busy-waiting until the storage operation completes.

In normal IO scheduling the app thread indicating "pending" would weave its way back up to the NtReadFile (332) of the kernel, where it either goes to sleep, or goes back into the application to do other work. Assuming that it goes to sleep, the application thread is removed from the CPU, and another thread is put on that CPU. At this point, the cached application thread state is lost from that CPU. This is part of what is referred to as context switch.

Continuing with the explanation of typical normal IO scheduling, it may be millions of CPU cycles later before the disk has completed the request. The disk device interrupts the system, which causes further shuffling as the operating system holds existing processing and sets up to handle the interrupt (348). In yet another context, the interrupt is handled and the operating system prepares to notify the original application thread that its request is complete. The interrupt handler schedules the callback to be prioritized and the interrupt is dismissed. The operating system would then execute the deferred procedure call, which gets the requested data arranged and calls back to the application thread (350).

At this point, the sleeping application thread is awakened by the operating system, and scheduled on a CPU (maybe the same one it was originally on, or maybe another one). The application thread finishes running back up the layers until it gets back to the next instruction after the original call to Win32 ReadFile. In other common operating systems, the flow of IO requests are much the same.

Thus, typical aspects of OS IO scheduling 390 introduce overhead. When each I/O request takes millions of CPU cycles, and CPU resources are scarce, this added overhead is not significant. But when I/O requests take orders of magnitude less time, and when multicore systems provide added parallel processing potential, the added scheduling overhead, contention for shared resources, and context switches become much more significant and detrimental to overall system performance. According to one aspect of this disclosure, the SV component with an APIO component intercepts any IO requests and largely circumvents the participation of the delay-inducing aspects of OS IO scheduling 390 entirely.

The above description illustrates how even in a single thread, the OS IO scheduling 390 introduces a bottleneck. In a parallel environment, the delays are multiplied. Moreover, the repeated involvement of OS IO scheduling 390 prevents the multicore system realizing its full parallel processing potential and productivity.

Figure 4:
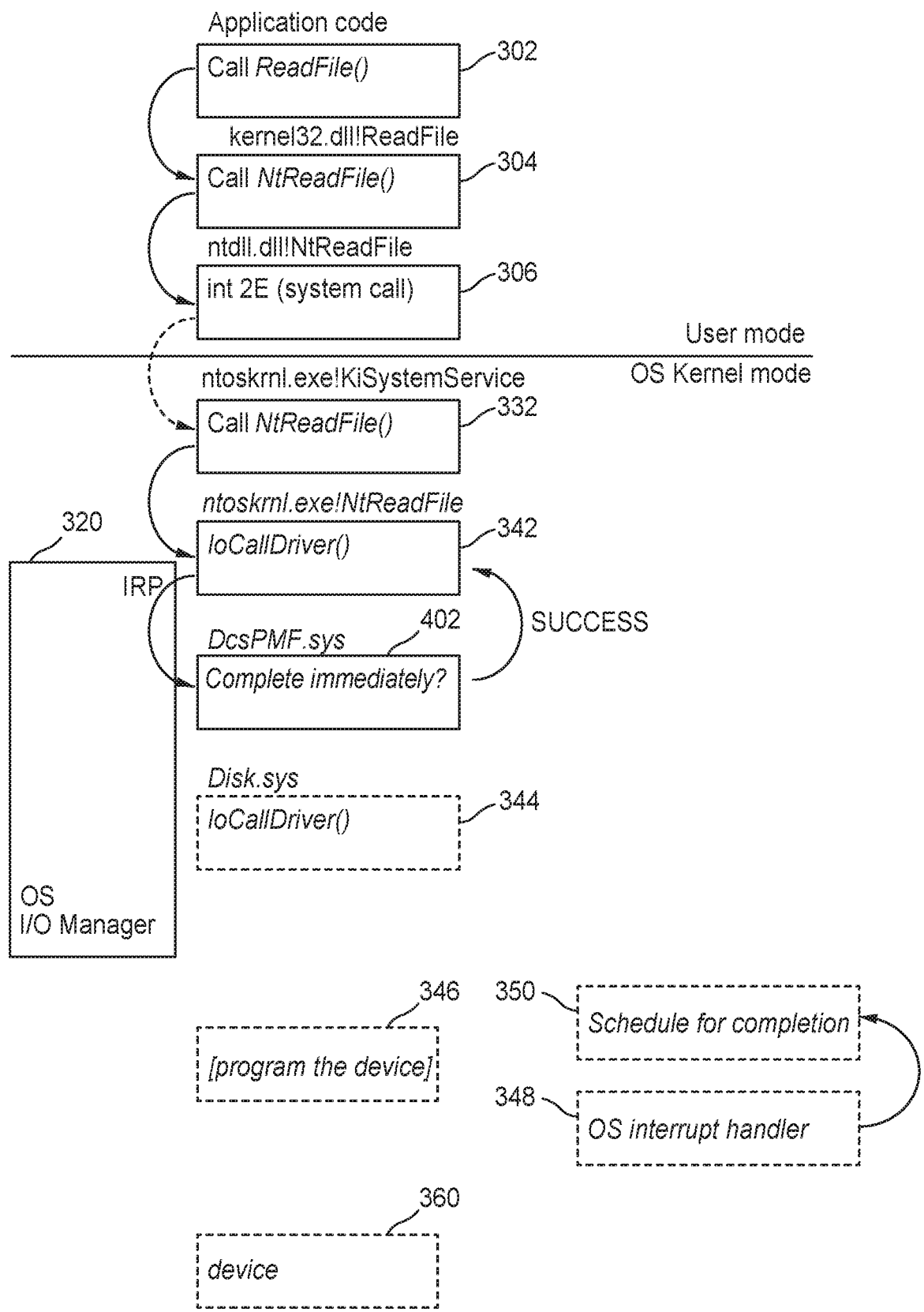
FIG. 4 is a block and flow diagram illustrating an example of storage virtualization with adaptive parallel IO in connection with an IO request subject to immediate processing.

FIG. 4 is a block and flow diagram illustrating an example of the operation of an SV component having an APIO component, in connection with a read operation (cache hit).

The APIO component processes IO requests in a highly parallel fashion, preserving local context as much as possible. In bypassing the OS IO sequencing component, the APIO component typically completes data requests in microseconds with very high probability, on the same CPU and in the same context as the application thread issuing the data request. FIG. 4 illustrates the integration of the component in a typical operating system environment, and how it helps realize the full parallel potential of a multicore server platform.

FIG. 4 illustrates a sequence of calls from an application to execute a read request against a virtual disk, under storage virtualization having an adaptive parallel IO component. An application initiates an IO request, here a read request (302). An application thread executing application code transfers to the Win32 API ReadFile (304). The application thread transfers to another Windows API, NtReadFile, where it executes a system trap instruction (306).

The application thread then switches to kernel mode, so that it can execute in the trusted areas of the operating system normally off-limits to running applications. The trap handler sends the application thread to another NtReadFile in the kernel (332). This initiates involvement of the Windows I/O Manager 320. In NtReadFile, the app thread builds an I/O Request Packet (IRP), sets it up to target a disk object, and then carries it into the I/O manager (342).

A portion of the APIO component that is registered with I/O Manager 320 as an upper filter driver is the first to see the IO request. It passes the request to the storage virtualization component for a determination whether it can be completed immediately (402). For example, with high probability, the requested data already resides in a high-speed cache, which is called a cache read hit (assumed present in FIG. 4). In this scenario, the SV component handles the IO request immediately. This takes place typically within microseconds of processing time. The filter driver then returns the requested data to the application immediately with "SUCCESS", synchronously, without invoking any of the underlying drivers; without waiting for, acquiring, and programming the device; without invoking any of the interrupt signaling or handling associated with the device completing a request. The original application thread context is preserved, the CPU cache state is preserved, and no other CPUs are disturbed. Contention for the device and contention associated with the device's interrupt is avoided altogether.

With the bypassing of the IO scheduling components of the OS, there is an immediate and substantial introduction of efficiency. Also, the efficiencies of avoiding contention among "upward" and "downward" bound storage-related threads are multiplied in a multicore environment. At the same time, it is useful for the storage virtualization component to be equipped for a parallel processing environment, so that the storage virtualization component does not itself introduced serialization on the IO request processing code path.

Figure 6:
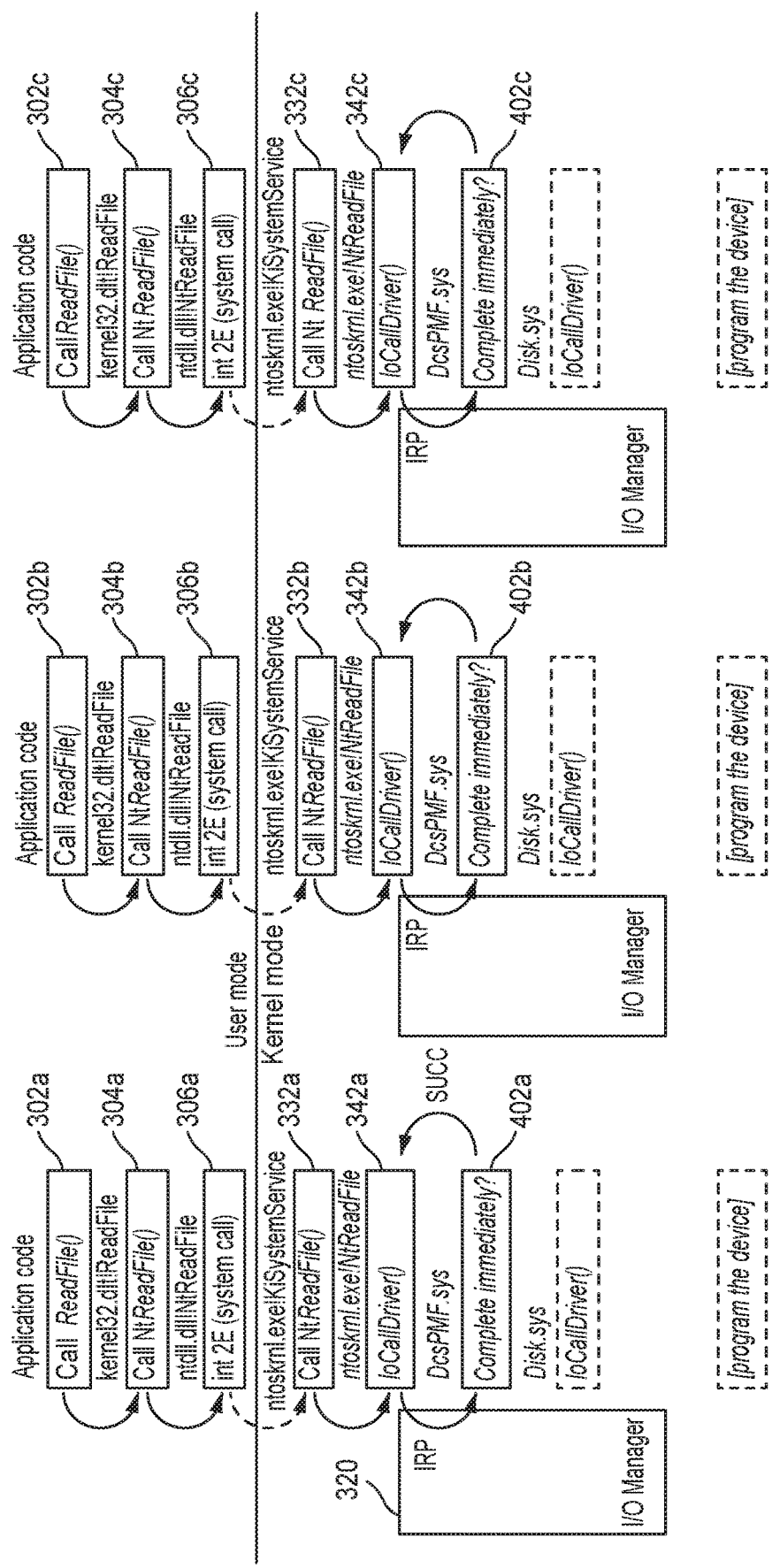
FIG. 6 is a block diagram illustrating storage virtualization with adaptive parallel IO in a parallel/multi-core environment.

FIG. 6 is a block diagram illustrating storage virtualization with adaptive parallel IO in a parallel/multicore environment.

The initiation of IO requests on application threads (302a-c), transfer to the OS (304a-c), execution of the system trap instruction (306a-c) and switchover to kernel mode (332a-c) all occur in parallel. Although three parallel instances are shown, there can be many more parallel threads in a typical multicore environment.

When multiple application threads are issuing requests simultaneously, the filter driver (342a-c) and storage virtualization component cooperate to keep each thread's request local to the CPU on which it is running. With high probability, the request is completed immediately (e.g., 402a-c) in the application context. Contention for shared objects is eliminated, and CPU state and pipeline throughput is preserved. The result is a highly parallel execution model, taking full advantage of the multicore processing platform's potential.

Figure 5:
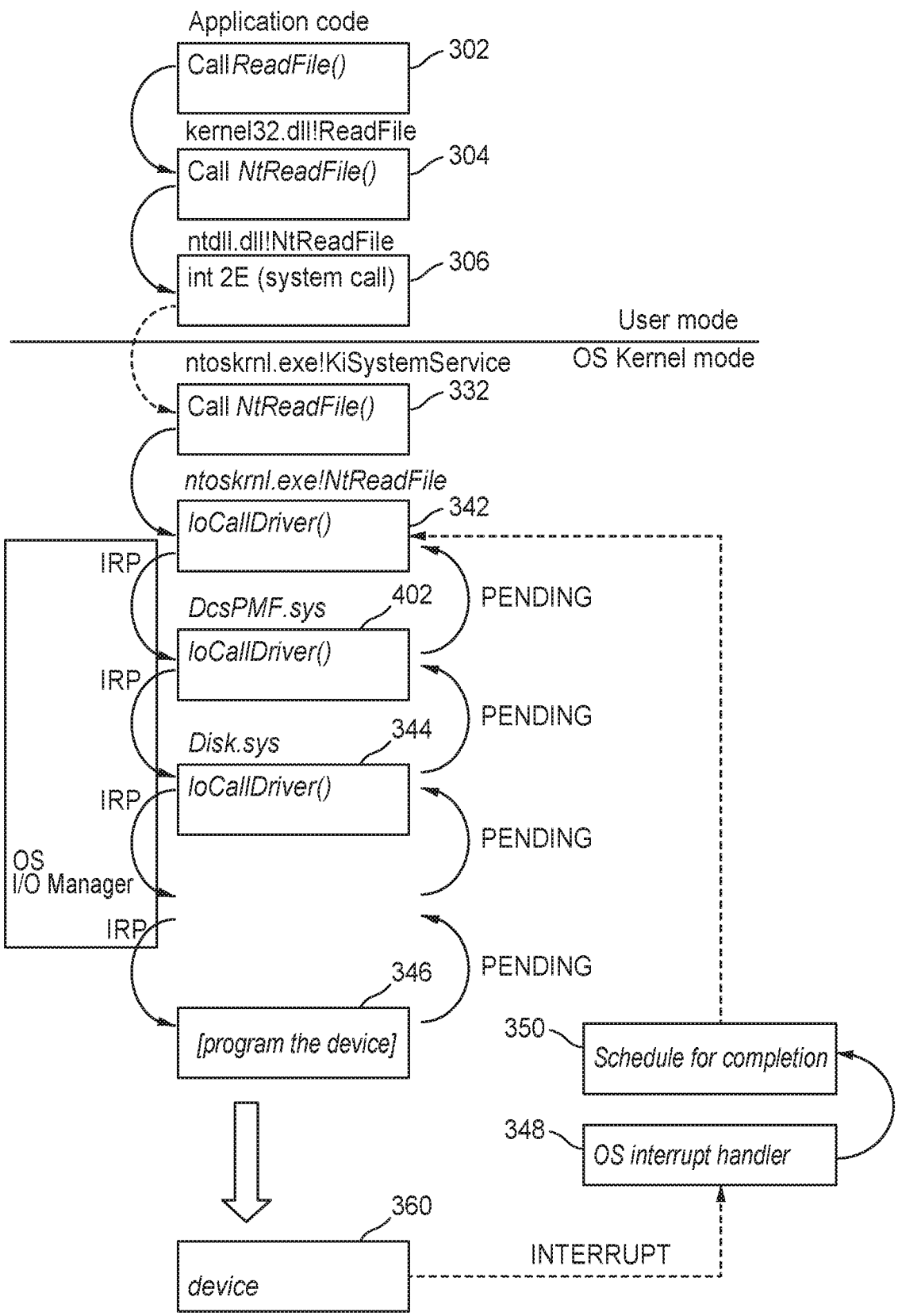
FIG. 5 is a block and flow diagram illustrating an example of storage virtualization with adaptive parallel IO in connection with an IO request not subject to immediate processing.

FIG. 5 is a block and flow diagram illustrating an example of storage virtualization with adaptive parallel IO in connection with another read operation (cache miss). The various modules in FIG. 5 correspond to those described for FIGS. 3-4 and need not be repeated. The notable aspects of the cache miss situation are that when the filter driver and storage virtualization component cannot satisfy the read request, then it will involve the existing OS I/O processing code path. This "re-introduces" the same delays that would be encountered in a conventional approach, but the cache miss situation is relatively rare. Moreover, when the storage virtualization component ultimately satisfies the read request, it brings the data thus read into its high-speed cache, so that a subsequent read request for that data will hit in cache.

Figure 7:
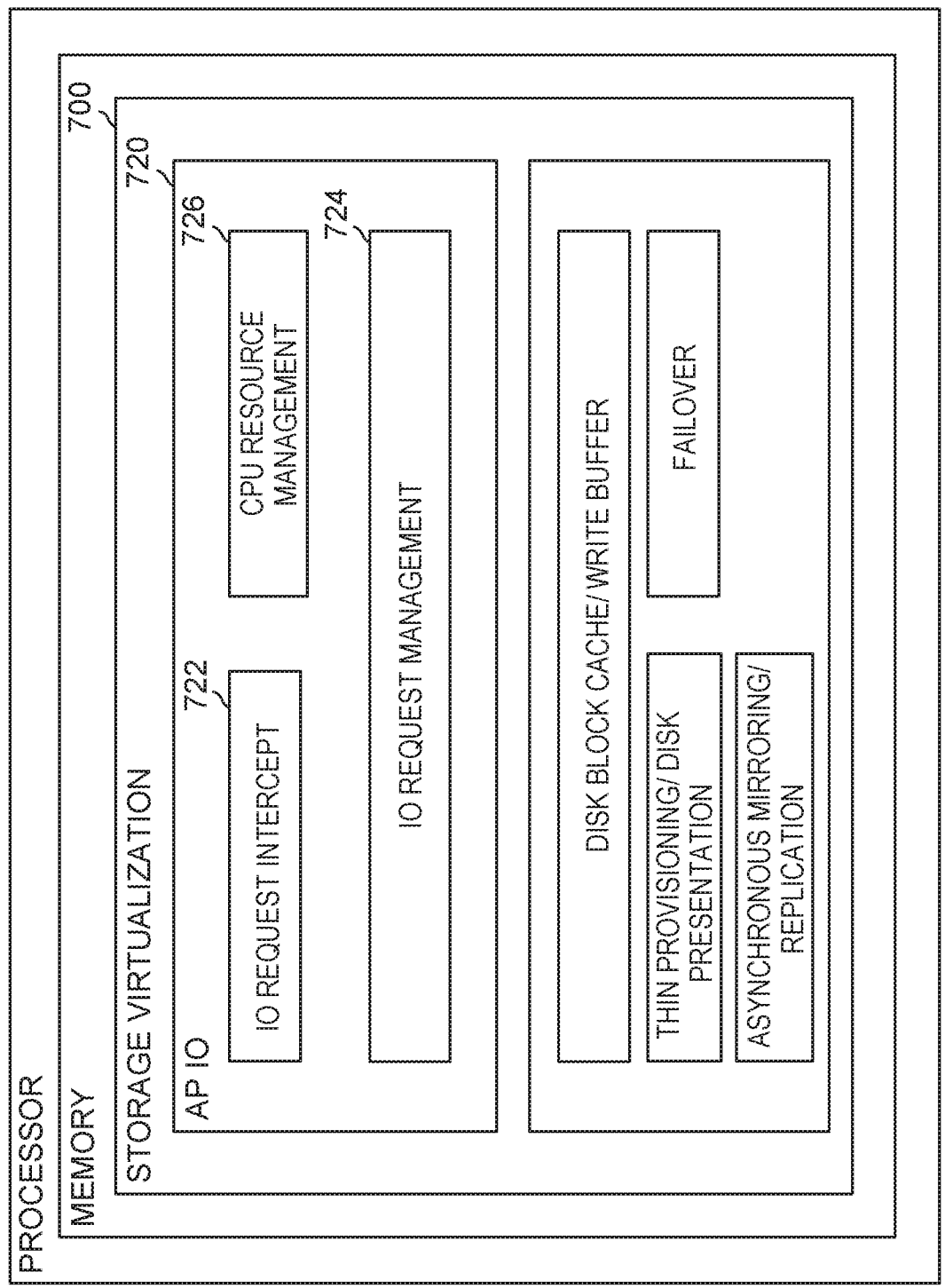
FIG. 7 is a block diagram illustrating an example of storage virtualization with an adaptive parallel IO component.

FIG. 7 is a block diagram illustrating an example of an SV component 700 including an APIO component 720.

The SV component 700 includes a variety of components that are available in storage virtualization including thin provisioning/disk presentation, asynchronous mirroring, failover/failback and asynchronous replication. The SV component 700 also preferably includes a disk block cache. This is a block level cache, which the stores data associated with virtual disks presented by the SV component 700, and is ideally provided in high speed memory for immediate access in response to IO requests. The disk block cache is updated based upon criteria including how recently the data for a given block has been read. When the SV component 700 receives a read request, it can either direct the read request from the cache (cache hit), or organize retrieval of the data when it's not resident in the cache (cache miss). The SV component 700 also handles write requests and preferably includes buffering so the incoming writes can be queued and thus immediately indicated as successfully received (e.g., in response to an incoming application thread with a write request). Various schemes may be used to maintain data coherency in organizing the queuing of writes and their ultimate resolution into the disk block cache and/or external storage resources.

The APIO component 720 includes an IO request intercept component 722, an IO request management component 724, and a CPU resource management component 726.

The IO request intercept component 722 includes the upper level driver that intercepts the IO requests before they progress through the above-described typical OS IO sequencing events.

The IO request management component 724 is in communication with the IO request intercept component 722. It determines whether a corresponding IO request is immediately serviceable by the SV component 700. In one example, a read request that results in a cache hit is an example of an immediately serviceable IO request. This may be performed through inquiry to the SV component 700 with respect to the state of the disk block cache. A write request is another example of an immediately serviceable IO request. This, however, may be subject to the current capacity of the disk block cache, and where applicable its corresponding write buffer. With respect to this, the disk block cache of the SV component 700 is configured to immediately indicate whether it can currently accept the write request. The IO request management component 724 receives the indication and processes the IO request accordingly, with "success" corresponding to the ability to immediately satisfy the IO request so as to omit normal OS IO scheduling.

The reads or writes that are immediately serviceable are handled as such, and the APIO component 720 passes the success of the IO request back up to the application immediately and without context switching. When the IO request is not immediately serviceable, the APIO component 720 provides instructions to pass the thread with the IO request back for regular IO scheduling.

The CPU resource management component 726 allows adaptive usage of multi-core processing platform (e.g., more CPUs). Traditional IO scheduling doesn't make use of spare CPU resources on demand. By contrast, the APIO 720 effectively invokes available CPU resources (i.e., available additional CPUs of the multicore platform on which it operates). But the ability to adaptively invoke available CPUs creates a tension between CPU resources to be used for application workload and those used for IO demand.

The CPU resource management component 726 is configured to make determinations as to whether IO requests can directly proceed (without invoking normal OS IO scheduling) using potentially available CPU resources. In one example, the determination is based upon a designated maximum number of CPUs that can be dedicated to IO demand. Thus, if an IO request arrives and there are remaining, available CPUs, and the maximum number is not reached, the CPU resource management component 726 informs the IO request management component 724 that the IO request is serviceable. This results in an indication of "success" for the IO request that is communicated back to the application as described.

It is important to note that in one embodiment, the indication that an IO request can be successfully handled can be made regardless of the state of the disk block cache. That is, even on a cache miss, or a situation where write buffer capacity is reached, the CPU resource management component 726 can inquire and inform as to currently available CPU resources for immediately processing the IO request. In this fashion, available CPU resources are used to pick up and satisfy the IO request as expeditiously as possible, instead of passing the IO request back up the chain for normal OS IO scheduling.

The CPU resource management component 726 may also use alternative or additional criteria to determination whether CPU resources can be used to handle IO requests. The CPU resource management component 726 is preferably configured to dynamically balance the availability of CPU resources between application demand and IO demand. It is configured to track instantaneous and historical IO and application processing loads, and to use that information to determine whether an available CPU resource may be allocated to an IO request. For example, historical information may show that the demand for application processing demand increases during a particular time period (e.g., 10 AM-2 PM). It may also show that demand for IO request processing increases during another particular time period (e.g., 8 AM-10 AM and/or 4 PM-6 PM). Either or both of these denoted time periods may be used to determine CPU resource allocation. In one embodiment, this information may be used to adjust the setting of the designated maximum number of CPUs that can be dedicated to IO demand. Thus, during the time period(s) where application processing is historically heavy, the threshold value (setting) for the maximum number of CPUs useable for IO demand decreases, whereas during the time period(s) where IO request processing is historically heavy, the threshold value increases. Still further, instantaneous demand levels are analyzed to further modify the decision making process. This can be embodied as additional adjustments to the maximum number of CPUs available for IO demand depending upon ongoing needs (IO v. applications) in real time.

In one example, the CPU resource management component 726 is also configured to apply Quality of Service (QOS) criteria to determinations whether IO requests can be immediately processed. For example, IO requests originating from a first set of applications may be given priority over those of other applications based upon a QOS guarantee provided to the first set of applications. For example, the QOS can be delineated among levels (e.g., levels 1-3) with a given first level being designated for highest priority, and so on. In one example, the threshold values for the number of CPUs available for IO request processing differs among the respective levels (e.g., level 3 maximum 20% of CPU resources, level 2 at 35% and level 1 at 50%). Moreover, these levels are configurable to similarly adjust depending upon historical and instantaneous demand levels, as described above.

In one embodiment, the CPU resource management component 726 is configured to apply all of the above described criteria to carry out determinations whether IO requests can be immediately processed using CPU resources on the multicore platform. This is preferably carried out using a set of rules or heuristics corresponding to the number of CPU resources and corresponding default thresholds, QOS criteria, and historical and instantaneous load values. Moreover, the settings for the determinations are configurable to accommodate customized allocation of CPU resources.

The SV component 700 including the APIO component 720 may be provided as software, such as resident in memory for execution by a processing unit as part of a processing system. It may also be provided as stored on a non-transitory computer readable medium (e.g., a disk) for downloading, uploading, selling, distributing, etc. of the SV component 700 with the APIO component 720.

Figure 8:
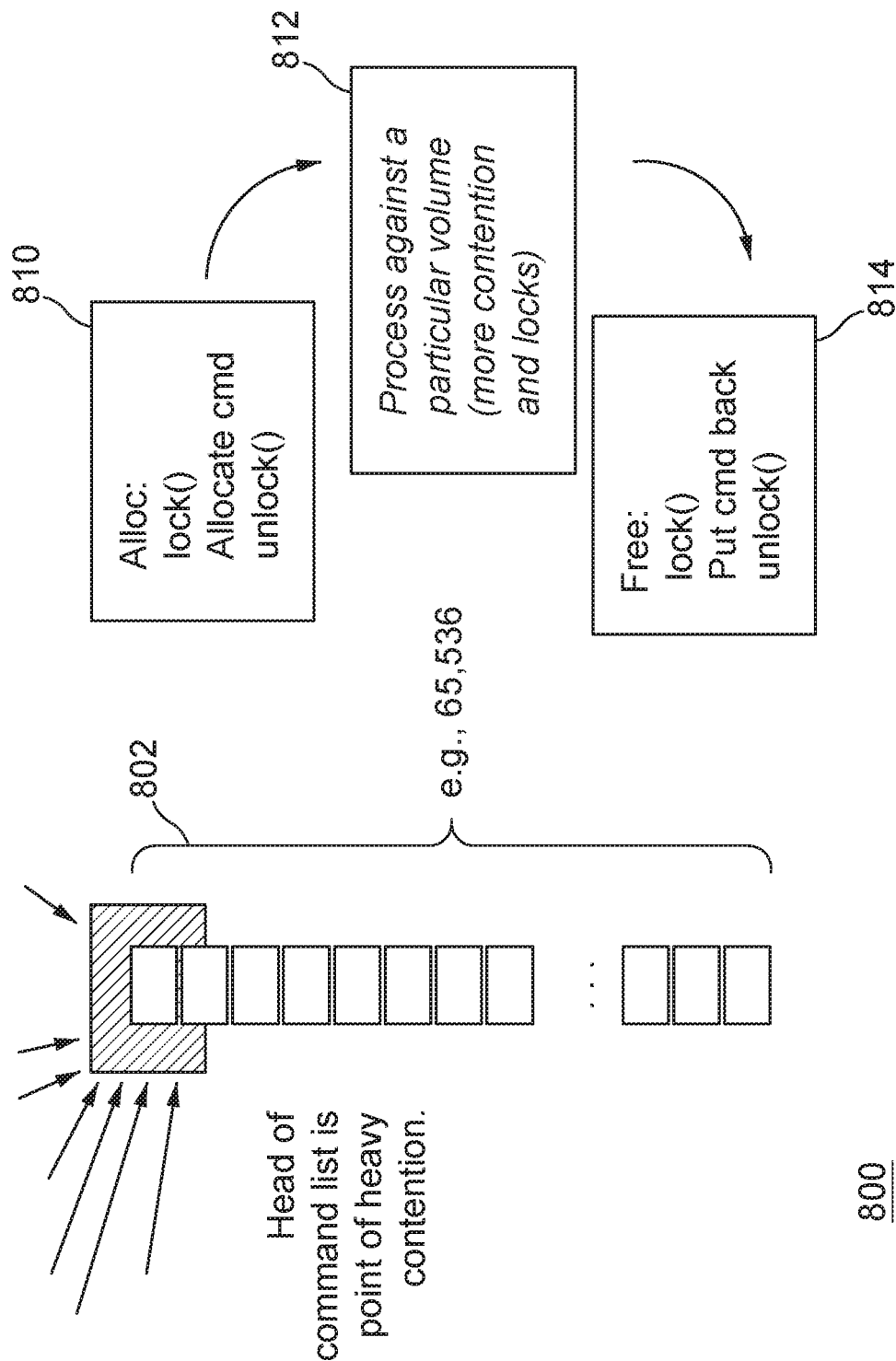
FIG. 8 is a schematic diagram illustrating contention in allocating and freeing commands associated with IO request handling.

FIG. 8 is a schematic diagram 800 illustrating contention in allocating and freeing commands associated with IO request handling.

As described above, a significant amount of IO Request processing delays are avoided in a multi-core environment in bypassing aspects of OS IO scheduling, where the opportunity to do so avails itself. When IO Requests progress through bypass processing, there are additional requirements and potential bottlenecks in carrying out the IO Request at lower levels, such as at the cache level.

For example, the cache of the storage virtualization components is typically configured to accept requests from client programs to read or write data against one or more logical random-access storage devices, which in the virtualization context are virtual volumes. The devices appear to the operating system as regular logical storage devices that can be addressed by block, for reads or writes. The cache of the storage virtualization component must manage the processing of these IO requests through software abstractions that represent the IO request making its way through the various stages of processing. In one embodiment, a cache may represent this using an abstraction called a storage command, or simply a command.

A command may be referred to as a representation of work in progress for an IO Request (e.g., a read or a write) that targets a device, offset and length. For example, a basic sequence for a read request may be characterized as:

(1) Build a command targeting the device, offset, and length;
(2) Issue the command;
(3) Copy data out using the command; and
(4) Free the command.

Similarly, for write requests, this may be characterized as:

(1) Build a command targeting the device, offset, and length;

(2) Request the command to allocate space into which the data to be written is copied;

(3) Issue the command; and (4) Free the command.

It should be understood that the command is not in itself an executable that carries out these processes. It is, rather, the representation and placeholder for the work to be done in carrying out the IO Request. The commands must be allocated and freed in a fashion that allows threads to coherently make IO Requests and receive responses (e.g., pending, callback, success) when they occur.

Referring to FIG. 8, a traditional free command list may list the available ("free") commands in a single doubly linked list 802. When a thread allocates a command to represent an application data read/write request, it is allocated 810 from this list. This involves locking the list, popping a command from the free command list, and then unlocking the list. In a multi-core environment, the head of the free command list 802 becomes a point of heavy contention as multiple threads on respective CPUs seek access to the list, creating a "lock convoy" of threads waiting to pass through the critical section guarding the list head. There is also the need for processing 812 of the IO Request against a particular volume. Each volume has at least some form of associated list that is periodically locked to link and unlink each command against the volume. This may be referred to as a device lock (even for a virtual volume). This also is a point of contention in a multi-core environment, where many threads are seeking access to the same volume. There is various work performed, including "backend" cache work in relation to processing 812 the IO requests, also potentially involving device locks. Finally, once the work associated with the command is completed, a free 814 process pushes it onto the free command list 802, and this again involves locking the free command list, increasing contention.

Figure 9:
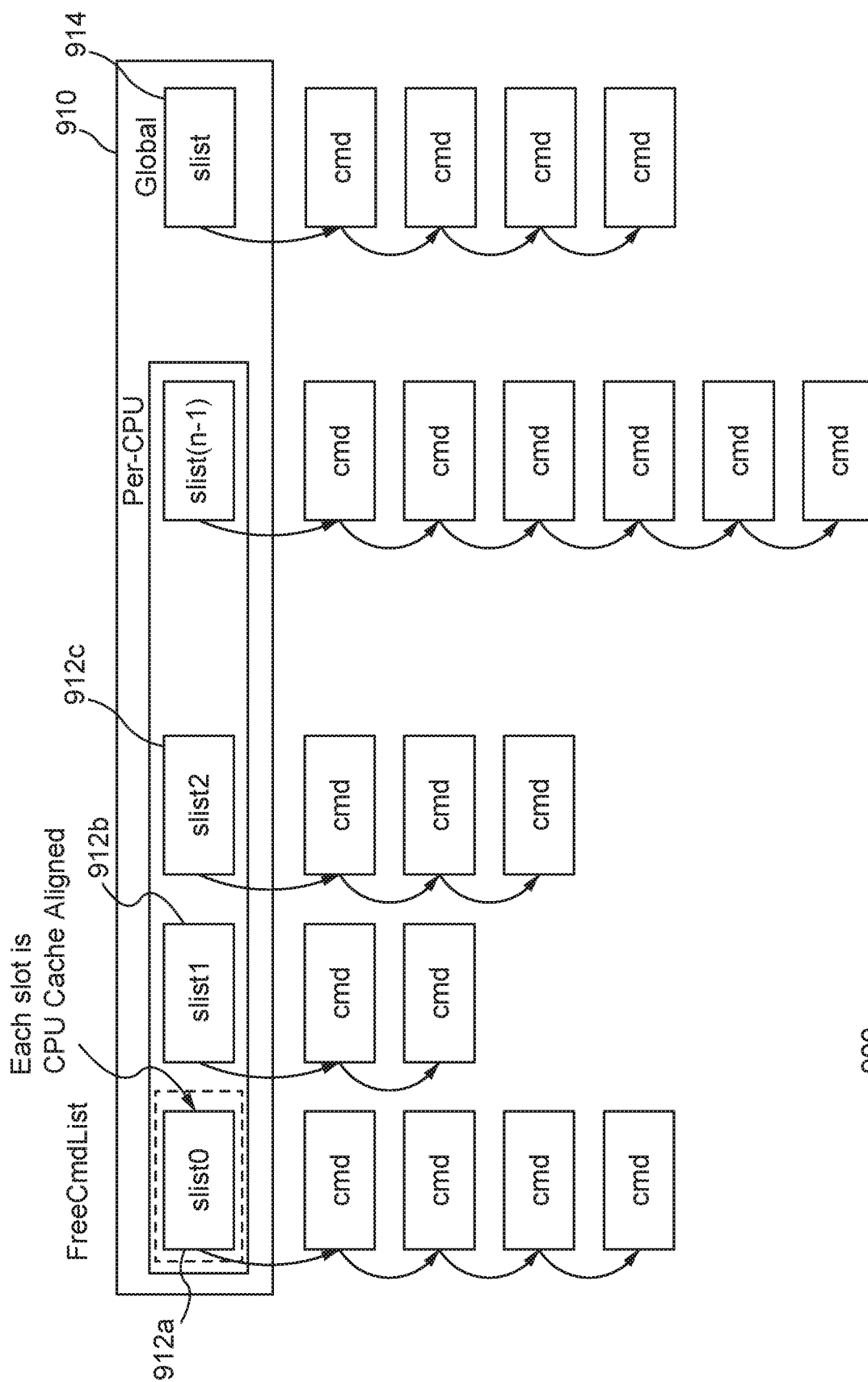
FIG. 9 is a schematic diagram illustrating an example of a parallel per-CPU free command list configuration.
Figure 10:
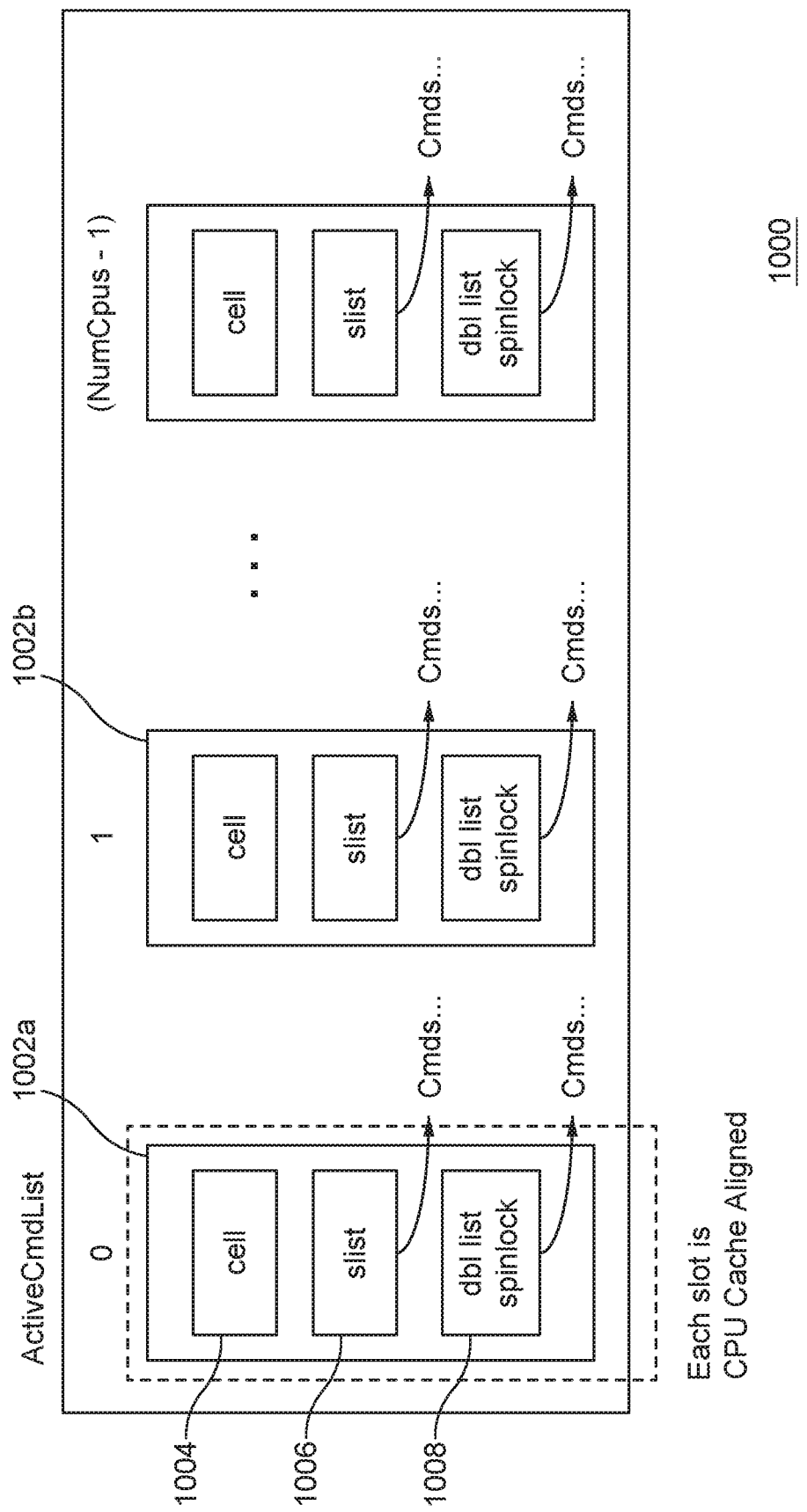
FIG. 10 is a schematic diagram illustrating an example of a parallel per-CPU active command list configuration.
Figure 11:
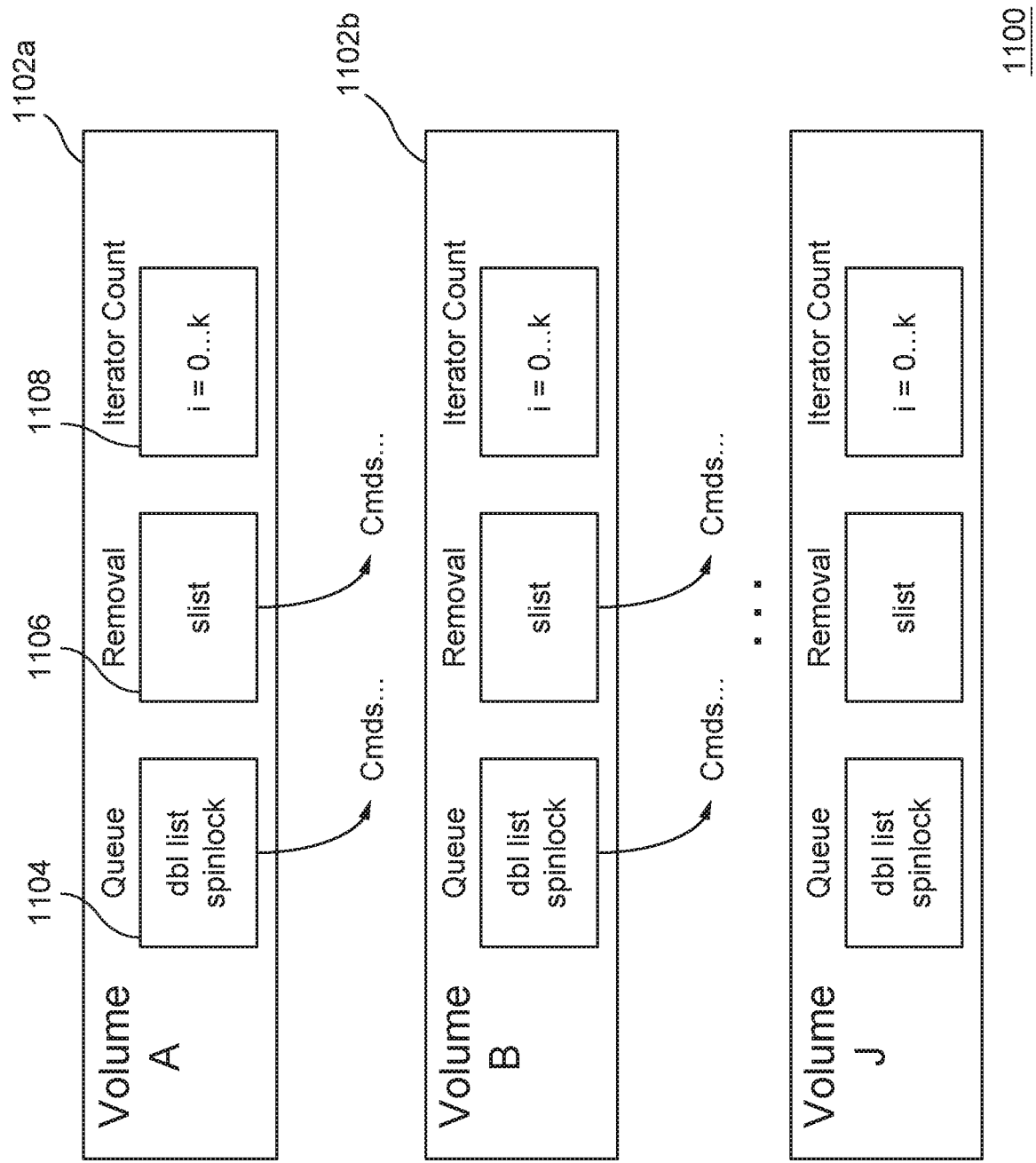
FIG. 11 is a schematic diagram illustrating an example a per-volume backend queue configuration.

One example of APIO in accordance with this disclosure implements data structures including a per-CPU free command list configuration, a per-CPU active command list configuration and a per-volume backend queue configuration, as introduced in FIGS. 9-11. This arrangement is evidently more complex than the simple command list 802 and per-volume structures 812 of FIG. 8. Thus, one might expect less efficiency. However, as described below, these arrangements and corresponding processes significantly increase parallel IO Request handling capacity in a multi-core environment, and significantly increase overall efficiency in processing IO Requests in a multi-core environment. Part of the reasoning for this is that the system is arranged to increase parallelism, and while it introduces some complexity, it provides clear avenues for straightforward IO Requests to be processed and cleared within a few short cycles, without context switching. Moreover, even for those IO Requests that do require some additional handling, mechanisms are provided to allow work to progress without causing lock convoys or the like that can greatly hinder other work from being performed, introducing latency, lengthening application response time.

FIG. 9 is a schematic diagram illustrating an example of a per-CPU free command list structure 900. It includes several per-CPU command lists 912a-c and a global command list 914. Preferably, the number of per-CPU command lists corresponds to the number of CPUs that could potentially host threads with IO Requests (e.g., "N"). Each per-CPU command list is configured as a so-called "lock-free" singly linked list (or "slist"). This provides a lock free data structure with atomic variables. By contrast, the single command list structure 802 of FIG. 8 provides a single doubly linked list guarded with a spinlock. With that structure, the list is locked whenever any thread seeks allocation of a command, or whenever a command is freed to the list upon completion. The parallel, lock-free, per-CPU command slists support only straightforward pop and push operations to allocate and free commands to the respective lists. The per-CPU command list structure is configured to allocate commands to the per-CPU list corresponding to the CPU on which a thread is executing. At times, the list of free commands in a given per-CPU list may be exhausted. Thus, the structure 900 also provides the global command list 914 from which commands can be allocated. The global command list 914 essentially provides a remaining number of available commands over the cumulative number of available commands in the per-CPU command lists. The global command list 914 is also preferably configured as a lock-free, atomic slist, having less overhead than a doubly-linked list guarded with a spinlock.

In addition to providing a configuration that allows allocation to numerous CPUs without creating a lock convoy, each slot in the per-CPU command list structure 900 is configured to be CPU cache aligned. This prevents multiple CPUs from attempting to access variables that are in the same (e.g., 64 byte) cache line, which would introduce inadvertent contention ("cache line ping pong") despite the presence of separate per-CPU cache lists.

FIG. 10 is a schematic diagram illustrating an example of a per-CPU active command list structure 1000. The per-CPU active command list structure 1000 includes several per-CPU active command list structures (e.g., 1002a-b). In this example, the number of these structures 1002a-b matches the number of CPUs ("N"). Additionally, each of the slots for the structures 1002a-b is CPU cache aligned.

The per-CPU active command list structure 1000 may be considered as a first stop for command processing. If a command can be completed very quickly, then it need never go further than the active command list. The per-CPU active command list structure 1000 uses high-performance platform primitives ('interlocked compare exchange'), high-performance "lock free" slists, and an array of per-CPU data structures and algorithms to handle first-stage command queuing. It is designed to increase CPU locality and minimize costly locking operations, so to produce maximum parallel throughput.

Specifically, each of the per-CPU active command list structures 1002a-b respectively includes a cell 1004, slist 1006 and doubly linked list 1008 component. Linking and unlinking are described further below, but generally the interlocked compare exchange is used in connection with the cell when the cell is available to link the command. When that is not the case, the lock-free atomic slist is used. And finally the spinlocked, doubly-linked list is used, but only when necessary.

FIG. 11 is a schematic diagram illustrating an example of a per-volume backend queue structure 1100. One of the issues with a naively implemented doubly linked list with a spinlock is that worker threads that are completing tasks at the back end of the cache in relation to IO Requests are locking the list as they iterate through it, even while other threads are trying to link additional commands to the list for processing. This means that the list is constantly being hit from the top (allocation) and the bottom (free) and is locking for all accessors. The creation of a separate structure 1100 with special consideration for "iterators" at the backend allows lock hold time to be minimized, thus helping to minimize contention in processing IO requests against these virtual volumes.

The per-volume backend queue structure 1100 includes several per-volume backend queues 1102a-b, preferably one for each of "X" volumes presented by the storage virtualization component. Each of the queues 1102a-b includes a doubly linked list 1104 and a removal list 1106. The doubly linked list 1104 is the primary listing for commands that have been allocated down to the volume. As noted above, some commands (e.g., on cache hit) are resolved at the active command list stage and thus do not need to progress to the backend queue. Those that do not get immediately resolved (e.g., cache miss) are listed in the doubly linked list 1104. Various worker threads operate on these doubly-linked lists 1104 to complete IO Requests at the backend, for example, finding, retrieving and placing data in the cache following a cache miss. These and other threads that need to process the backend queues are referred to as iterators. At any given point in time, several iterators may be processing a particular backend queue, even while additional application or poller threads are attempting to add commands to these backend queues for additional processing. Coordination among all these threads is required, but if a worker thread processing a backend queue holds a spinlock for the entire time it spends iterating through the list, that will cause significant contention for that list's spinlock. A mechanism is therefore provided to minimize the time the spinlock is held. A variable (e.g., Iterator Count) is used to track the number of iterators currently "in" a given per-volume backend queue 1102a-b. The structure 1100 is configured to allow many threads to interact with a given backend queue simultaneously, without any of them having to hold the queue's spinlock for an extended period of time; for example, holding the spinlock while iterating through the entire set of commands in the doubly linked list 1104, possibly numbering in the hundreds. Instead, especially when there are iterators actively walking through the queue, the completed commands may simply be placed in the removal list 1106 (an slist), which does not require the entire list to be spinlocked. When later conditions make it easier to process the removals without contention (e.g., when no iterators are left), the commands in the removal list 1106 can be processed against the doubly linked list 1104, thus the commands in need of removal can be finally removed/unlinked from the backend queue.

Figure 12A:
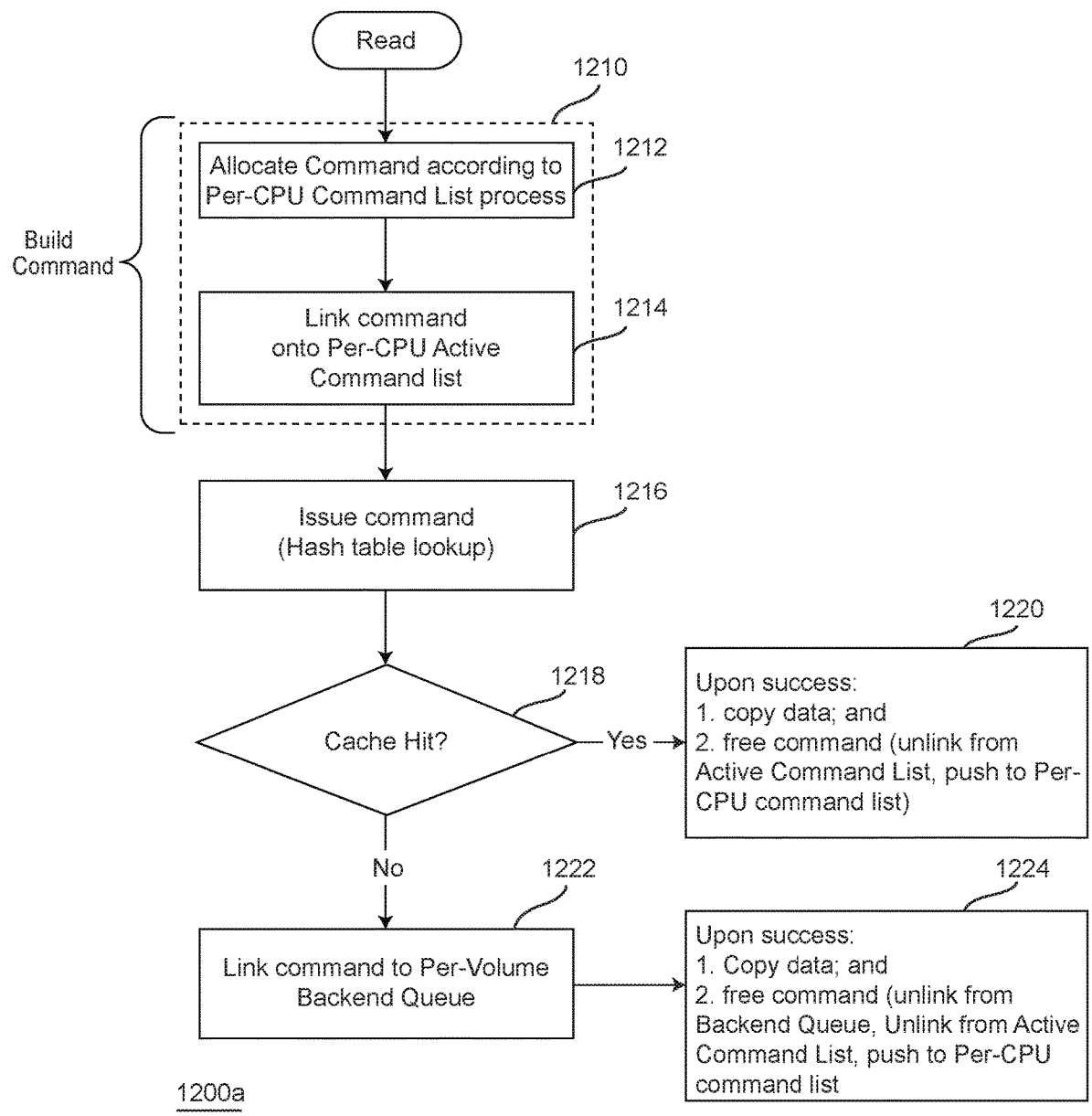
FIG. 12A is a flow diagram illustrating an example of a read process implementing the list configurations of FIGS. 9-11.
Figure 12B:
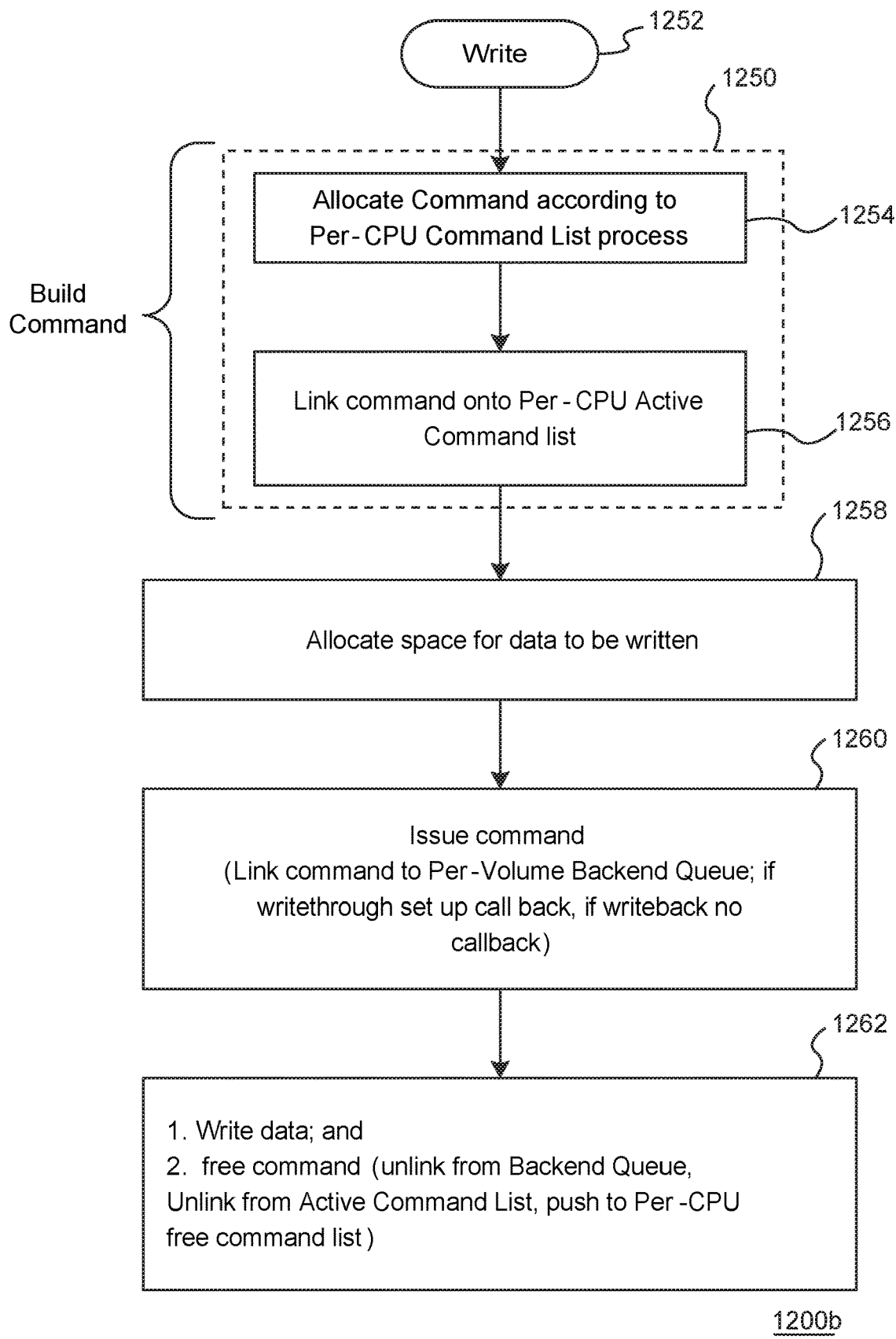
FIG. 12B is a flow diagram illustrating an example of a write process implementing the list configurations of FIGS. 9-11.
Figure 13:
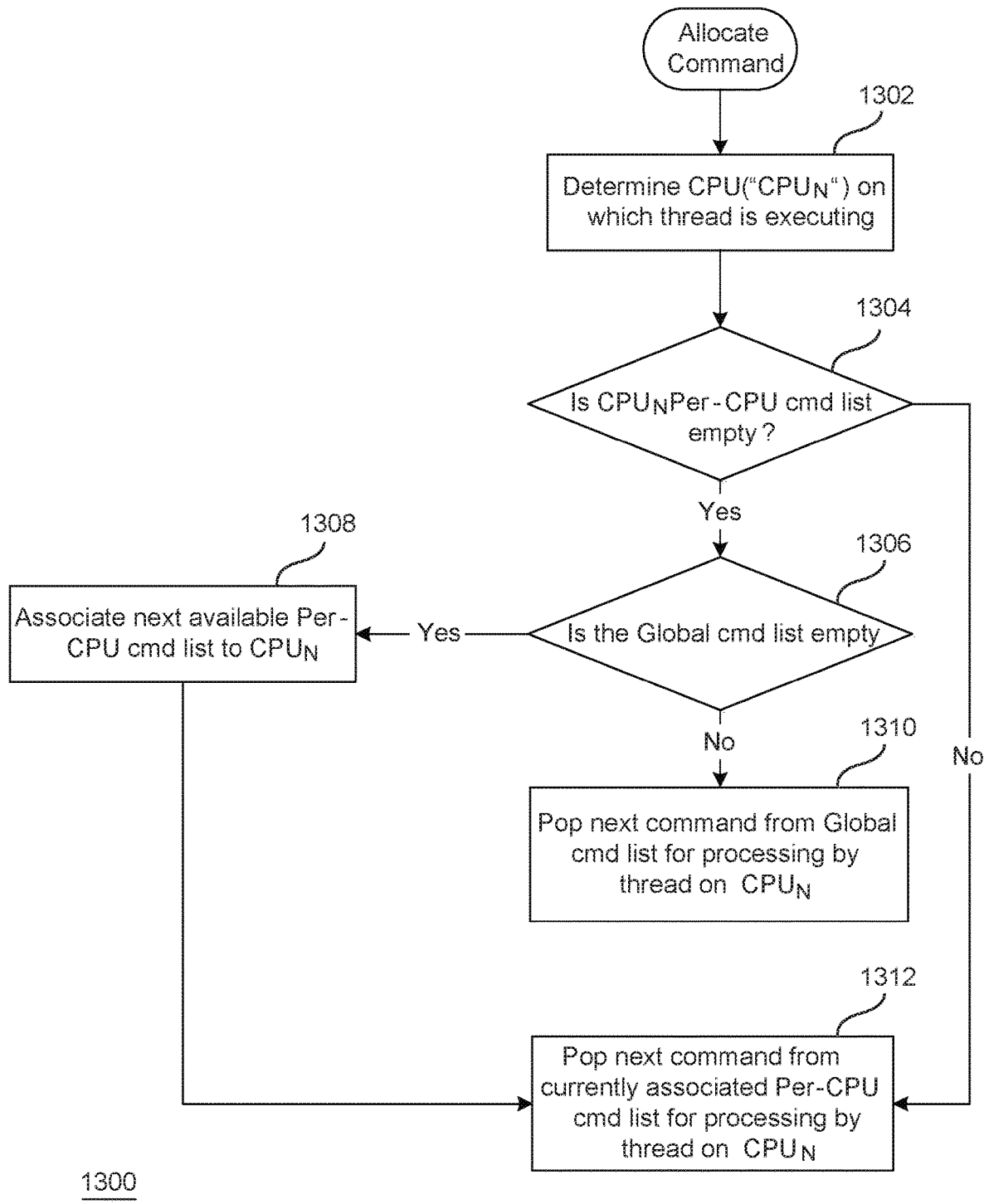
FIG. 13 is a flow diagram illustrating an example of allocating a command according to a per-CPU command list process.
Figure 14:
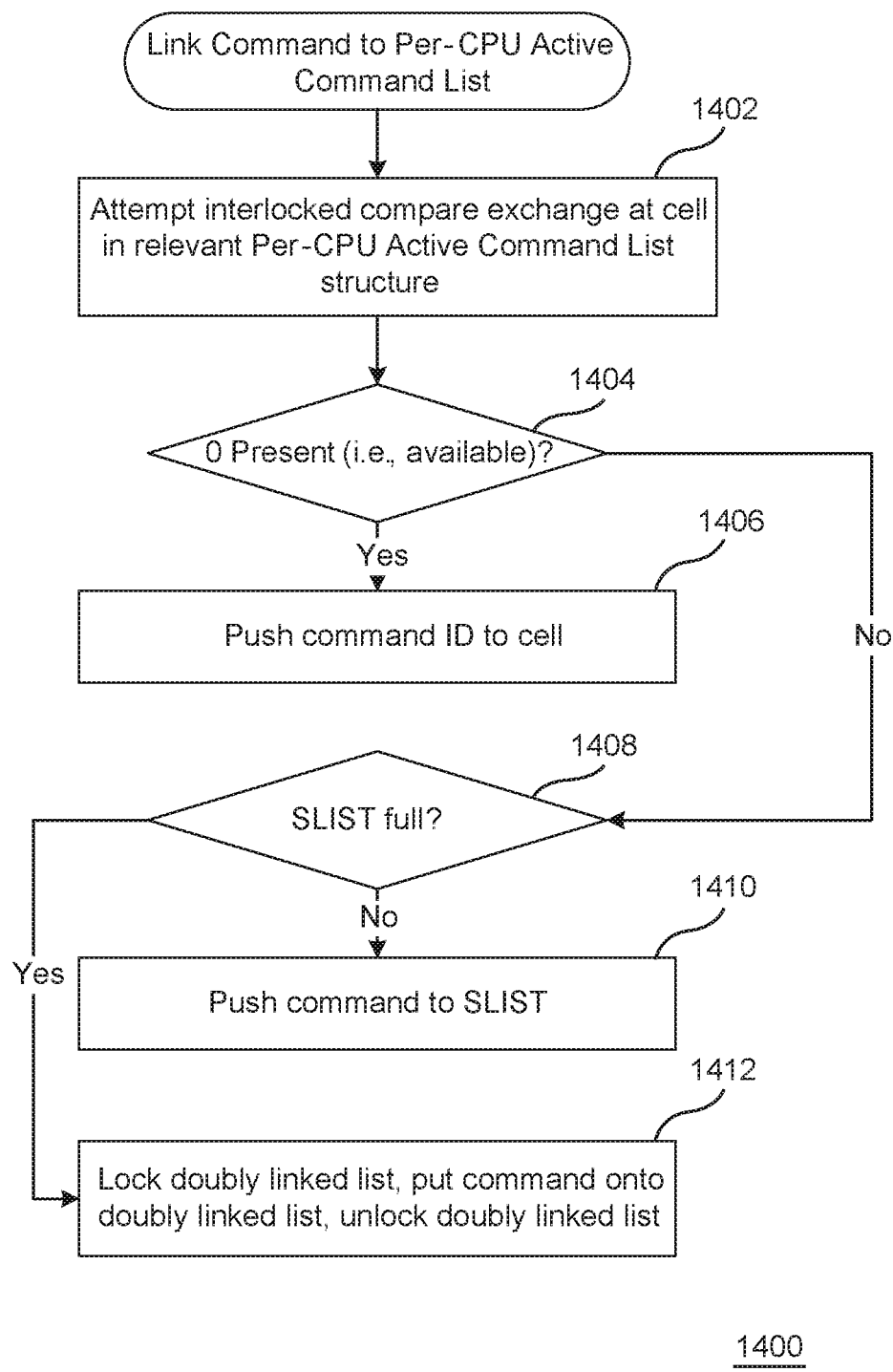
FIG. 14 is a flow diagram illustrating an example of linking a command to a per-CPU active command list.
Figure 15:
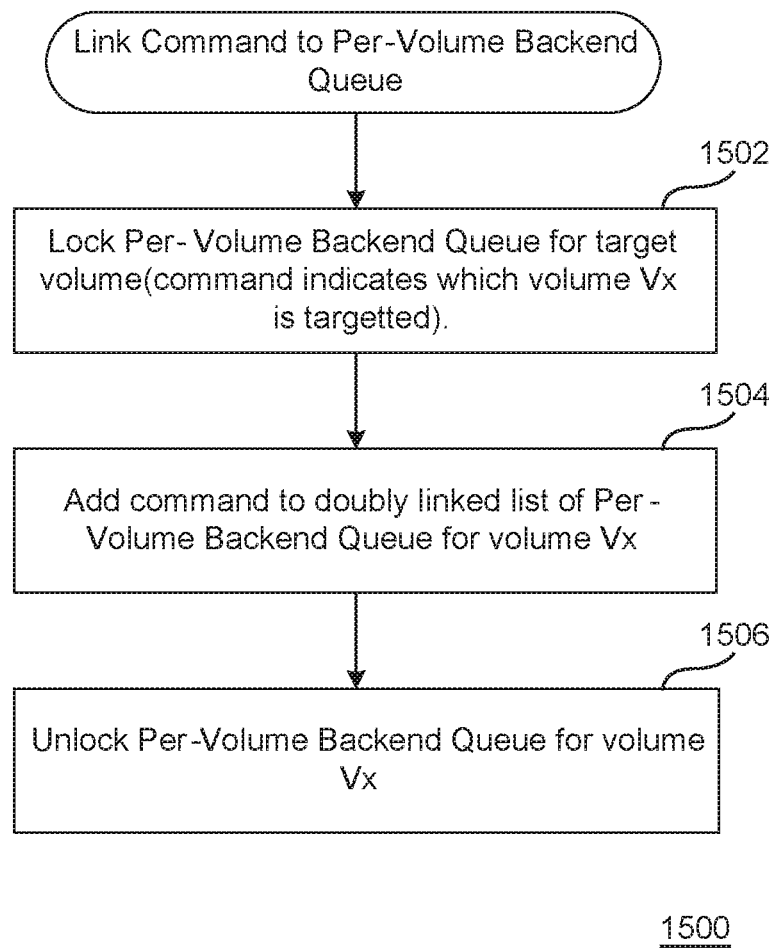
FIG. 15 is a flow diagram illustrating an example of linking a command to a per-volume backend queue.
Figure 16A:
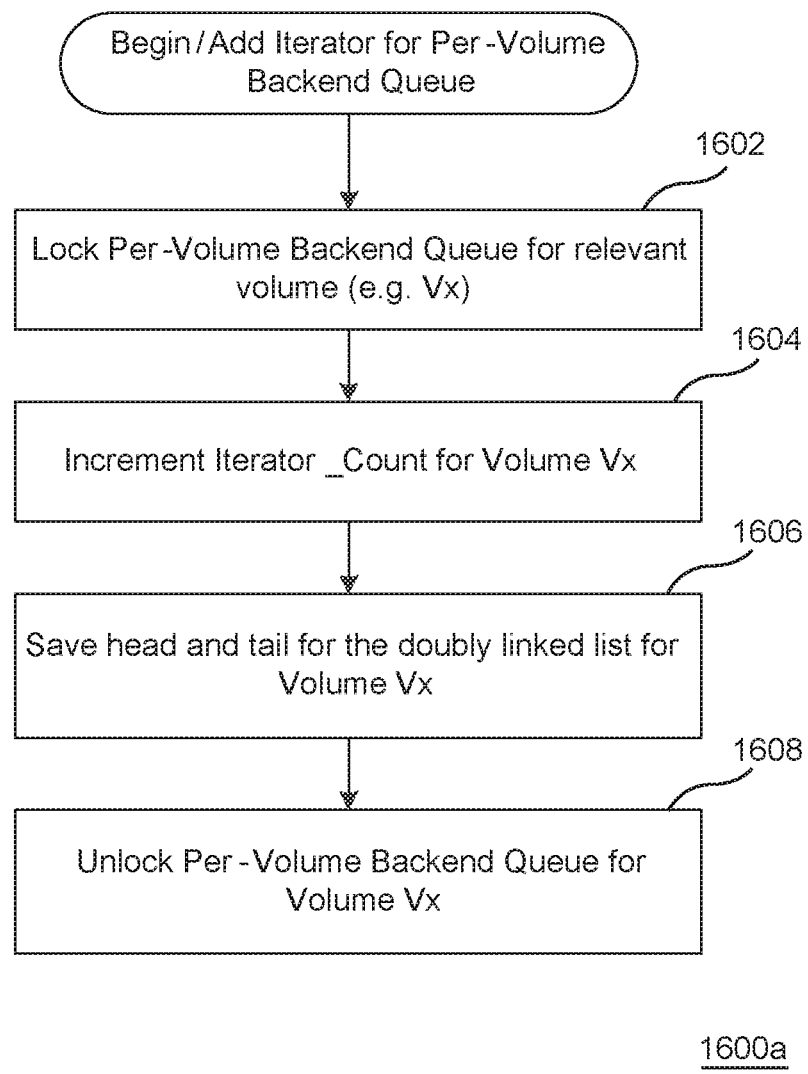
FIGS. 16A-B are flow diagrams illustrating iterator begin and end processes in association with a per-volume backend queue.
Figure 16B:
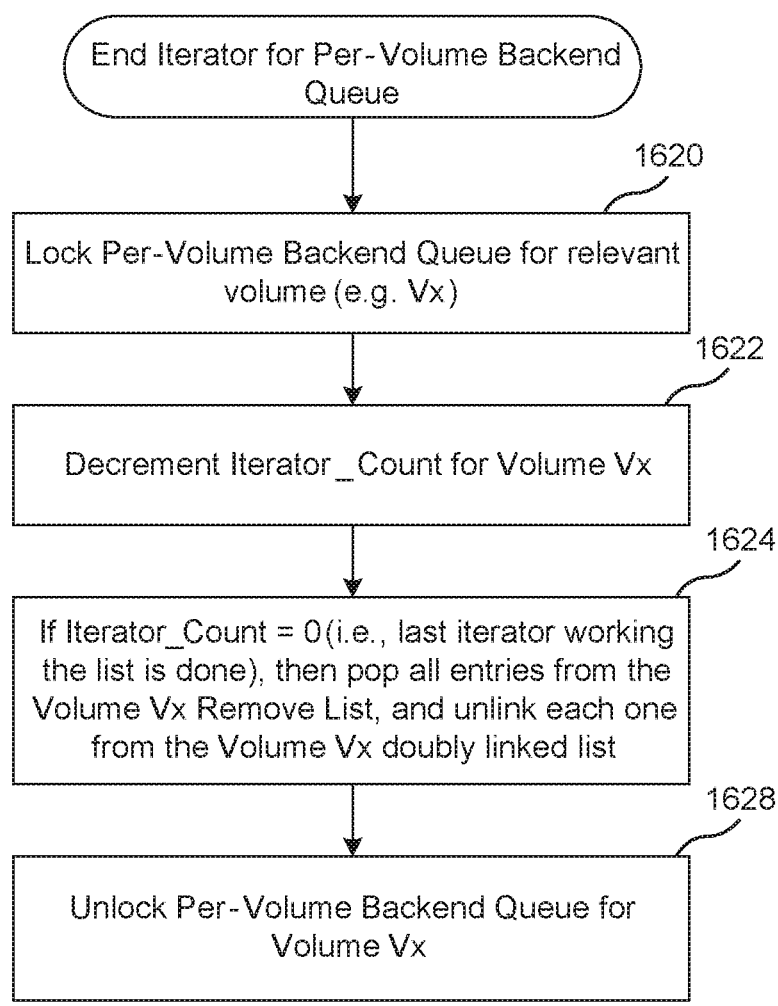
Figure 17:
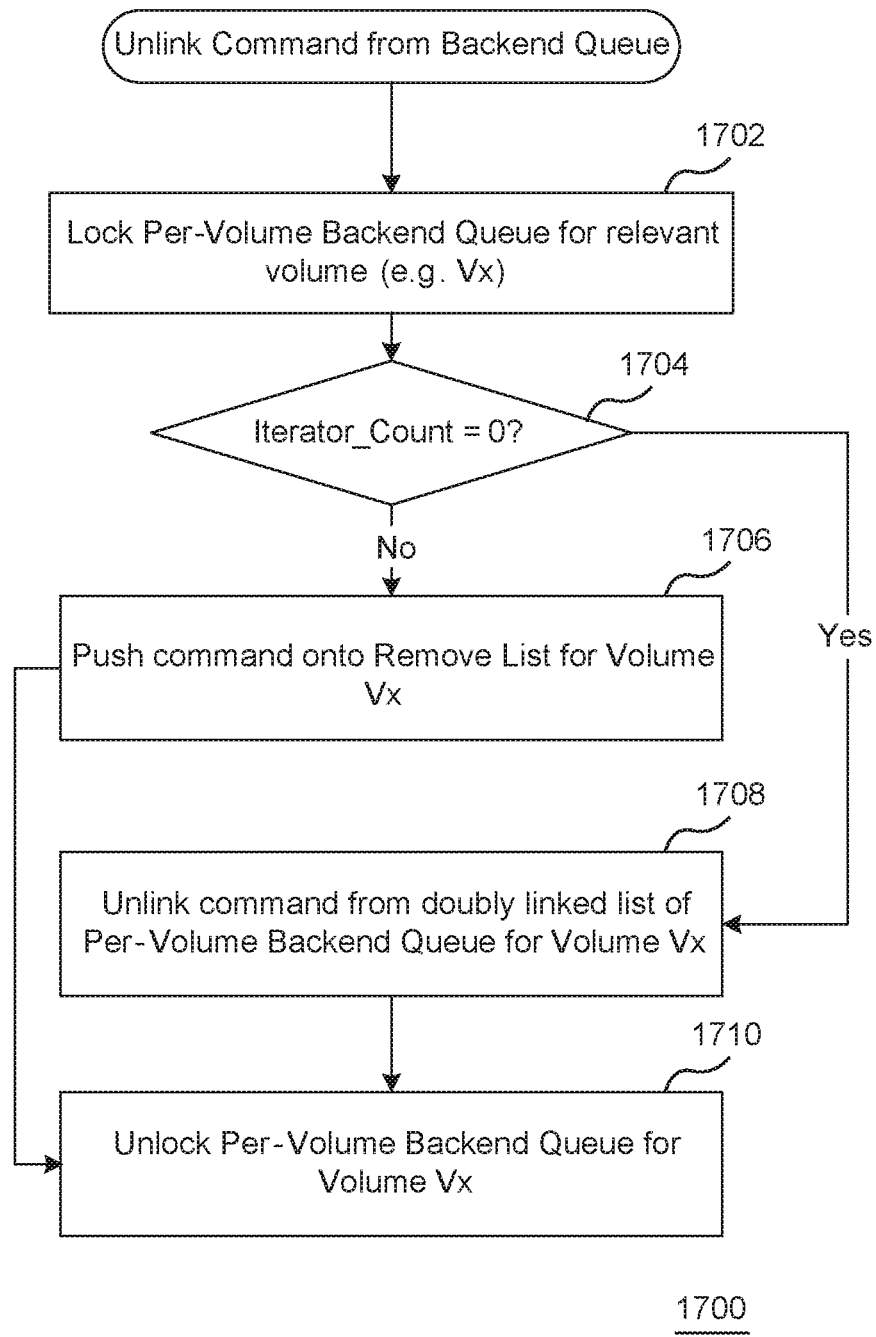
FIG. 17 is a flow diagram illustrating an example of unlinking a command from a per-volume backend queue.
Figure 18:
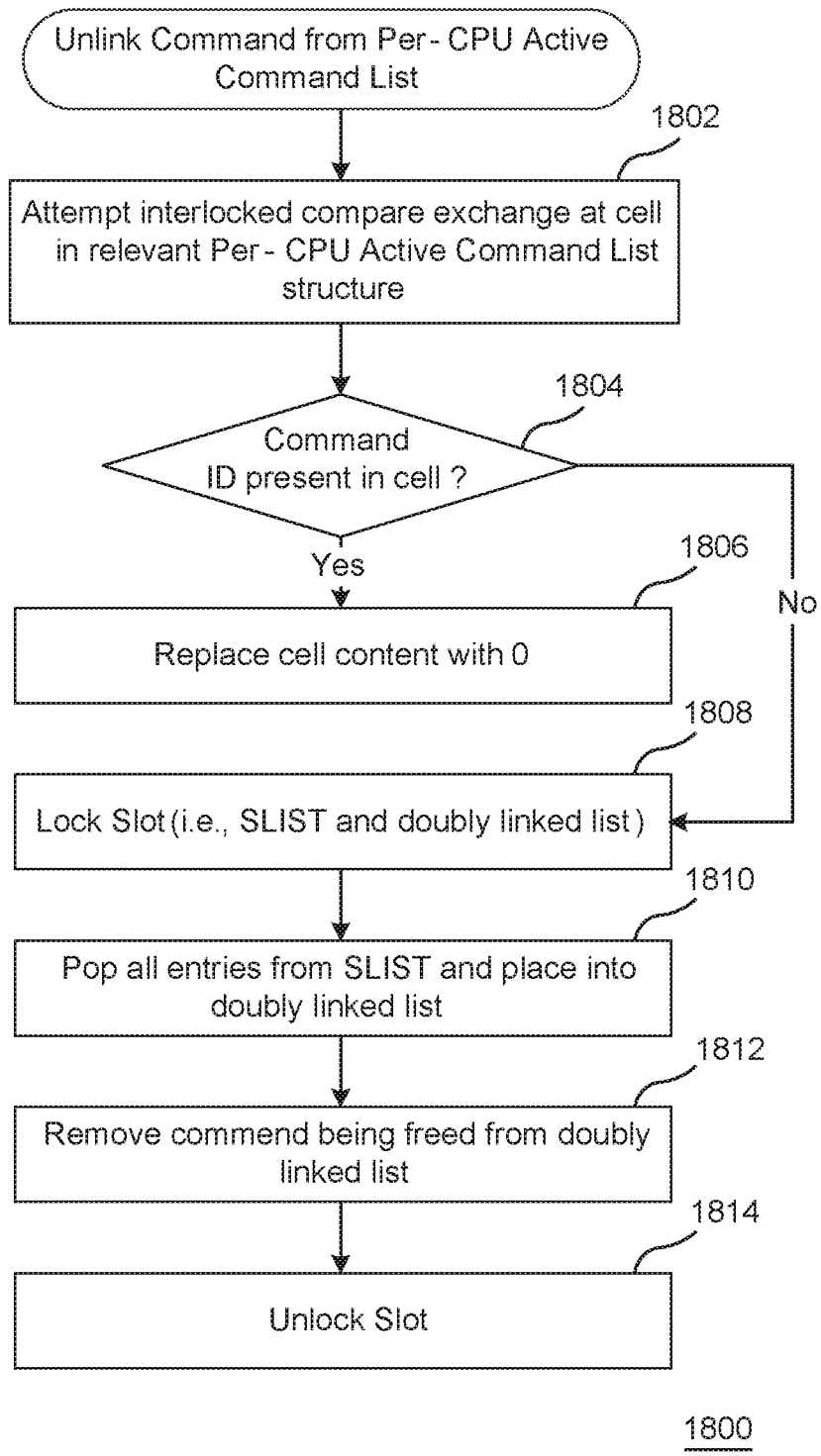
FIG. 18 is a flow diagram illustrating an example of unlinking a command from a per-CPU active command list.
Figure 19:
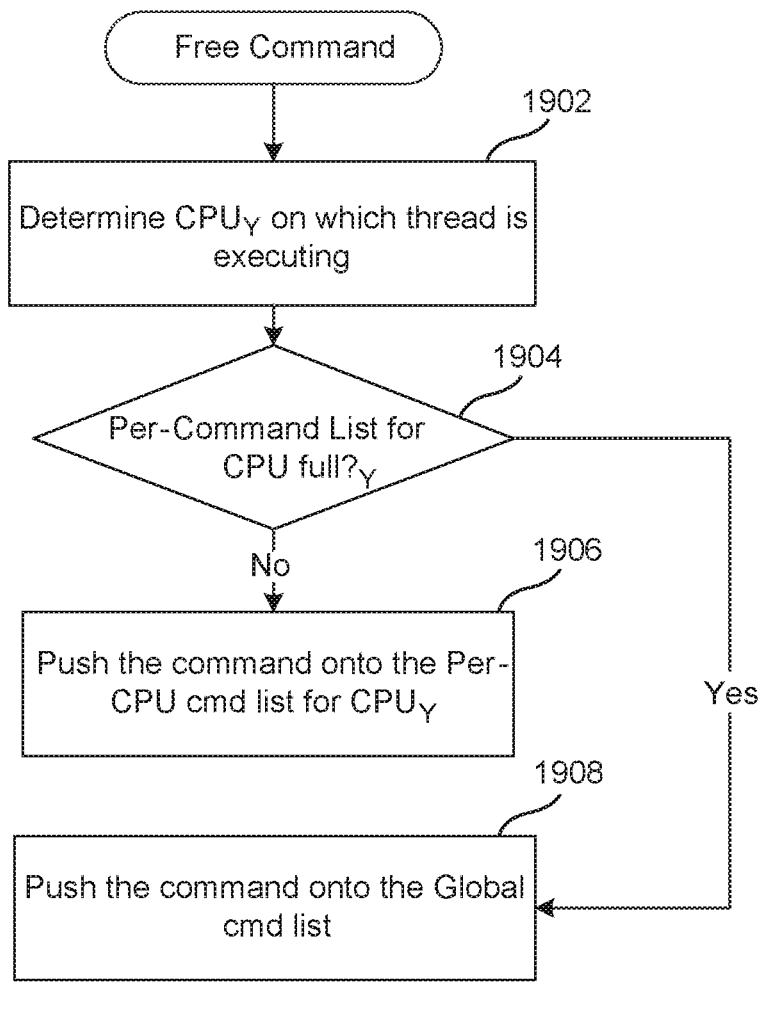
FIG. 19 is a flow diagram illustrating an example of freeing a command according to a per-CPU command list process.

FIGS. 12A-B and 13-19 illustrate processing of IO Requests and corresponding command management using the described structures. FIGS. 12A-B provide an overview of a read and a write operation. FIGS. 13-15 illustrate command allocation and linking, FIGS. 16A-B illustrate backend queue processing, and FIGS. 17-19 illustrate unlinking and freeing of completed commands.

FIG. 12A is a flow diagram illustrating an example of a read process 1200a and providing an overview of the participation of the per-CPU command list 900, per-CPU active command list 1000, and per-volume backend queue 1100 in a typical scenario. An application initiates an IO Request by targeting a logical device according to an offset and length. At the cache level, this entails building 1210 a command targeting the device, offset and length. This involves the per-CPU free command list structure 900 and the per-CPU active command list structure 1000. First a command is allocated 1212 according to the per-CPU free command list process (FIG. 13) and then the command is linked 1214 to a Per-CPU active command list (FIG. 14). Preferably, all incoming commands are subject to these procedures to maintain system coherency (e.g., the ability to further process the IO request and to call back to the thread in the event that it is necessary).

Once this allocation and linking is completed, the command is issued 1216, whereupon the storage virtualization component seeks to resolve the IO Request encoded in the command. This is typically started with an attempt to complete the read from the cache. Presence of the data in the cache may, for example, be determined via hash table lookup.

If it is determined 1218 that there is a cache hit, then a sequence 1220 for a cache hit is undertaken. The data is copied, followed by a free command process. In the cache hit scenario, the free command process merely requires unlinking from the per-CPU active command list (FIG. 18) and pushing the command to the relevant per-CPU or global free command list (FIG. 19). The basic cache hit scenario thus involves the complete and coherent completion of the IO Request in only a few processing cycles, in a fashion avoids contention with other threads on other CPUs that are seeking to further IO Requests.

If it is determined 1218 that there is a cache miss, then the command is linked 1222 to the relevant per-volume backend queue. While work progresses on the command, the backend queue is updated accordingly. Once the command is completed, a sequence 1224 similar to the cache hit scenario ensues, with the additional requirement to unlink the command from the per-volume backend queue (FIG. 17).

FIG. 12B is a flow diagram illustrating an example of a write process 1200b and also indicates that the per-CPU command list, per-CPU active command list and per-volume backend queue are included in a typical scenario. Just as with a read, an application initiates an IO Request (write) by targeting a logical device according to an offset and length. At the cache level, this similarly entails building 1250 a command targeting the device, offset and length, and involves the per-CPU free command list structure and the per-CPU active command list structure. A command is allocated 1252 according to the per-CPU free command list process (FIG. 13) and then the command is linked 1254 to a Per-CPU active command list (FIG. 14).

For a write, the process 1200b then allocates 1256 space for the data to be written, and then the command is issued 1258. In one example, all writes are linked to the Per-Volume backend queue, whether the application makes the write request write-through or write-back. If the application requests write-through, then the write request is reported as pending, and a callback is arranged for notification upon completion of the write request, after the data has been committed to the backend. By contrast, when the application submits a write request as a write-back type, the write request is "dumped" into cache buffers, and the application accepts the immediate completion of the command and that a callback will not be received.

Ultimately, the data is written 1260 and then the command is freed, in a fashion similar to that described regarding a read request wherein the backend queue is invoked. That is, the command is unlinked from the Backend Queue, unlinked from the Active Command List and finally pushed to the Per-CPU free command list. In one example, the command free process is used regardless of whether the write request is of the write-through or write-back type.

FIG. 13 is a flow diagram illustrating an example of a process 1300 for allocating a command. Generally, the process 1300 implements "N" per-CPU command lists in conjunction with a global list in order to allocate commands in parallel on a multicore processing platform. An application thread (or other type of thread, such as a poller thread) will be executing on one of the CPUs as the IO Request is received and slated for processing. Each CPU has one of the per-CPU command lists (0 through N−1) associated therewith. The associated per-CPU command list is determined 1302 according to which CPU the thread is executing on at the time that the IO Request is being processed. Thus, if the thread is running on CPU3, it will look to the per-CPU command list for CPU3. If it is determined 1304 that the corresponding per-CPU command list is not empty, then the next command is popped 1312 from the currently associated per-CPU command list. Each per-CPU command list is preferably an atomic lock-free slist to minimize the cost of coordination required in order to pop the command from the list in a thread-safe manner. In the command freeing process that is described below, it is noted that at times a command free process may push a command, once completed, to another per-CPU command list. Because of this, there may be times where any given one of the per-CPU command lists empties. If it is determined 1304 that this is the case, then the global command list is the next possible source of an available command slot. If the global command list is not empty, then the process pops 1310 the next command from that list. If the global command list is also empty, then the process progresses through remaining per-CPU command lists, finds 1308 a per-CPU command list that is not empty, and pops 1312 the command from that associated per-CPU command list. The command lists (per-CPU and global) are slists with atomic variables, and so they are "thread-safe" for the processing of the command even if the list from which a free command is obtained does not "belong" to a particular CPU. In this way, contention among many threads attempting to allocate commands simultaneously on a multicore platform is drastically reduced, thus lowering latency along that code path, and increasing parallelism and throughput of the system.

FIG. 14 is a flow diagram illustrating an example of a process 1400 for linking a command to a per-CPU active command list. As explained above, the per-CPU Active command list includes three components, a cell, an slist, and a doubly linked list. There are also N slots (0 through N−1) corresponding to the N CPUs, each being CPU cache aligned. Generally, linking a command to the per-CPU active command list entails firstly attempting to use the cell (fastest and most computationally efficient) followed by the lock-free atomic slist (slightly more costly) and then the spinlocked doubly linked list (most costly).

Initially, an interlocked compare exchange is attempted 1402 at the cell that is relevant to the per-CPU active command list for the CPU on which the thread is executing. If it is determined 1404 that a null value is present (0), then this indicates that the cell is free and the command ID is pushed 1406 to the cell. The presence of the command ID in the cell will indicate occupancy of the cell slot in a subsequent linking to the corresponding active command list. That is, while the cell is used for one command, it cannot be used for another. However, when the existing command represented in the cell is unlinked, a 0 is written to the cell to return the cell to "available" status.

If accessing the cell fails and it is determined 1408 that space within the slist is available (i.e., not fully occupied) then the command 1410 is pushed to the slist. Where both the cell and the slist are not available, the doubly linked list is locked 1412, and the command is put onto that list, and then the doubly linked list is unlocked. The number of entries available in the slist can be configured as desired, balancing the need for the list to have sufficient entries to accommodate usage of the slist without constantly having to go to the doubly linked list, against the overhead that is required to process the slist when it is moved down to the doubly linked list (i.e., more entries, more difficult to clean up). In one example, each slist has 16 entries to strike this balance.

As is evident from the allocating and linking processes, when a cache hit is involved, the IO Request can be immediately furthered with just the processing required to allocate the command (per-CPU slist process) and an extremely efficient interlocked compare exchange, or a still very efficient slist in most instances. Even where a lock for the doubly linked list is invoked, it is only for the per-CPU active command list, and does not prevent other commands from going forward in other per-CPU slots.

FIG. 15 is a flow diagram illustrating an example of a process 1500 for linking a command to a per-volume backend queue. Circumstances will arise where an IO Request is not immediately processed, such as a read that results in a cache miss. There, some backend work is required in order to complete the IO Request. The per-volume backend queue is added so that it can provide a mechanism for listing and removing commands without requiring repetitive access to and potential locking of the per-CPU lists. As introduced above, each per-volume backend queue uses a doubly linked list as the main queue or list, and a removal list (an slist) that is used to list commands whose removal is pending. Although locking is required to add a command to the per-volume backend queue, it is done in a simple lock-add-unlock operation such that the lock is not held for a long period of time. Specifically, a given command indicates the volume Vx at which an IO Request is targeted. On the cache miss, or where otherwise necessary, the per-volume backend queue for the target volume is locked 1502, the command is added 1504 to the doubly linked list in that particular per-volume backend queue, and then the per-volume backend queue is unlocked 1506. These operations occur in the requesting application or poller context.

FIGS. 16A-B are flow diagrams illustrating iterator begin 1600a and end 1600b processes in association with a per-volume backend queue. Inclusion in the backend queue presumes additional processing to complete the IO Request associated with the command. A typical example of listing a command in the backend queue is upon a read request with a cache miss. In that instance, typically, other ("worker") threads retrieve the necessary data, update the cache, and indicate readiness for removal from the backend queue. These worker threads and some other threads that access the backend queue may be referred to as "iterators" that are working the list of commands in the backend queue. If there were no special consideration given to parallelism in the implementation of the backend queue, the iterators would need to lock the per-volume backend queue in association with command processing, possibly for extended periods as when they iterate through the potentially long lists of commands queued for backend processing. If the backend queue were solely a doubly linked list with a spinlock, the worker threads would often need to lock the queue for extended periods in order to access the queue, perform processing, and then update the queue.

By contrast, with the removal list and the iterator_count variable (iterator_count=number of iterators working the queue), a worker thread holds the spinlock of the backend queue only long enough to increment the iterator_count for the relevant per-volume backend queue, save the head and tail pointers for the queue, and then release the spinlock. With the iterator_count greater than 0, and the atomically updatable removal list, the worker thread can browse the backend queue confident that the list will not be corrupted by the actions of other threads, because other threads will mark commands for deferred removal (i.e., push them to the removal list), instead of trying to entirely unlink them from the queue immediately.

The add iterator process 1600a commences with locking 1602 the per-volume backend queue for the relevant (IO Request target) volume Vx. The iterator_count variable of the per-volume backend queue Vx is incremented 1604. The head and tail for the doubly linked list in the per-volume backend queue Vx are saved 1606 and then the per-volume backend queue Vx can be unlocked 1608. The thread (and any other threads working the queue) may go forward with processing, without having to hold the lock for the backend queue.

The end iterator process 1600b (FIG. 16B) may be best understood by first referring to the process 1700 for unlinking a command from a per-volume backend queue, as shown in FIG. 17. The per-volume backend queue for the relevant volume (Vx) is locked 1702, then reference to the value of the iterator_count variable is made to determine if there are iterators working the queue. If it is determined 1704 that there are no iterators present, then the corresponding command can be unlinked 1708 from the doubly linked list of the per-volume backend queue. In other words, an iterator_count of 0 means there is no concern that iterators are accessing the list, so there is no concern that unlinking the command will disturb another thread walking through the list, so the command is quickly unlinked from the doubly linked list and the spinlock is released 1710, having been held for a minimum of time. If, however, there are iterators present (iterator_count>0) then the command is pushed 1706 in a relatively simple atomic operation to the removal list (a lock-free atomic slist), and the spinlock is released 1710, having been held for a minimum of time. This means that the queue is not locked for long periods of time when iterators are present, since the command can simply be pushed to the removal list. And when iterators are not present, there is less contention potential, and a relatively straightforward removal of one command from the doubly linked list can be made.

Referring again to FIG. 16B, the end iterator process 1600b pertains to where an iterator is done working the per-volume backend queue. Again, the per-volume backend queue for the relevant volume is locked 1620. Here, the iterator_count variable is decremented 1622.

If iterator_count is down to 0 (i.e., the last iterator working the queue is done), then (in step 1624) all of the entries in the removal list for that volume are popped, with each of these commands unlinked from the doubly linked list as they are popped from the removal slist. This maintains the integrity of the queue since the operation is only performed when no other iterators are presently working the commands in the queue. If the iterator_count is greater than 0, then step 1624 is not performed due to the remaining presence of other iterators. Afterwards, the per-volume backend queue is unlocked 1628.

A worker thread may sometimes need access to all of the pending commands for a volume Vx, and such commands may be on various per-CPU active command lists and per-volume backend queue. A flush operation may be used wherein each per-CPU active command list is accessed and any commands pertaining to volume Vx are moved to the per-volume backend queue for volume Vx, permitting the complete list of commands for the volume to be examined.

In a free command process, a command must still be unlinked from the per-CPU active command list to free the command. FIG. 18 is a flow diagram illustrating an example of a process 1800 for unlinking a command from a per-CPU active command list.

On the linking process, it was noted that the cell was firstly attempted with respect to the command in question, whereupon if the cell was available, the command ID was placed in the cell. Here, again, a very efficient interlocked compare exchange is used to examine whether the command to be unlinked is listed in the cell. However, instead of the presence of a "0" on the linking side (indicating cell availability), the attempted 1802 interlocked compare exchange looks to see whether the cell contents are the command ID for the command being unlinked. If it is determined 1804 that the command ID is present, then a 0 can be written 1806 to the cell, which indicates cell availability for a subsequent linking attempt. Also, the command is thus unlinked from the per-CPU active command list.

If it is determined that the cell contents are not the command ID, this means the command is either in the SLIST or the doubly linked list. On the linking side, the SLIST can simply be used up to its capacity, which helps throughout on the linking side. However, removal requires popping 1810 the entries in the SLIST into the doubly linked list, then removal 1812 of the command being unlinked from the doubly linked list (could have been in the SLIST, could have already been in the doubly linked list), and finally unlocking 1814 the slot for the relevant per-CPU active command list.

Finally, the command can be freed to a command list. FIG. 19 is a flow diagram illustrating an example of a process 1900 for freeing a command according to a per-CPU command list process. During processing of the IO Request, although it is not typical, a thread may have been moved from one CPU to another. The free command process 1900 simply seeks to push the command onto the list corresponding to the CPU on which the thread is executing at the time the command is freed. Firstly, it is determined 1902 which $CPU_y$ the thread is running on, and if the per-CPU command list ($CPU_y$) is determined 1904 not to be full, the command is simply pushed 1906 onto that per-CPU command list $CPU_y$. If the relevant per-CPU command list is full, then the command is pushed 1908 to the global free command list.

It is understood that popping a command from one per-CPU command list and not necessarily pushing the command to the same per-CPU command list will potentially result in imbalance conditions. Accordingly, periodically, the per-CPU lists can be rebalanced to default conditions.

Figure 20:
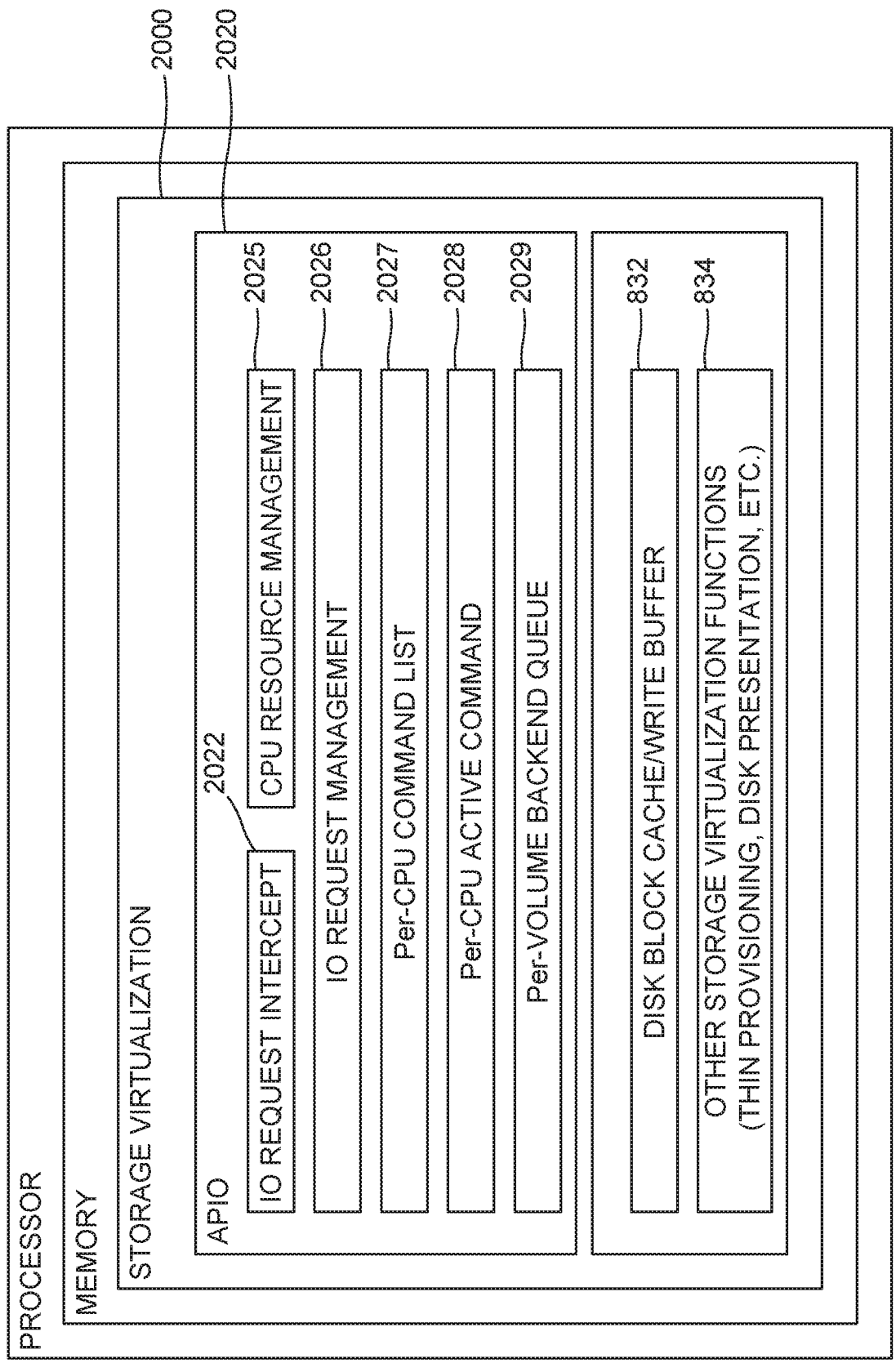
FIG. 20 is a block diagram illustrating an example of storage virtualization with an adaptive parallel IO component including command list processing.

FIG. 20 is a block diagram illustrating an example of a storage virtualization (SV) component 2000 with an adaptive parallel IO (APIO) component 2020 including command list processing.

The general characteristics of the SV component 2000, as well as the IO Request Intercept 2022, CPU Resource Management 2025 and IO Request Management 2026 aspects of the SV component 2000 are described above in connection with FIG. 7 and need not be repeated. Similarly, the disk block cache/write buffer 832 and general storage virtualization functions 834 (such as disk presentation, thin provisioning, etc.) also are described and need not be repeated.

The APIO component 2020 also includes Per-CPU Command List Management 2027, Per-CPU Active Command Management 2028 and Per-Volume Backend End Queue Management 2029 components.

The Per-CPU Command List Management 2027 component is configured to maintain the per-CPU and global command lists and to perform the allocate command and free command processes described above. The Per-CPU Active Command Management 2028 component is configured to maintain the per-CPU active command lists and to perform the link command to active command list and unlink command from active command list processes described above. The Per-Volume Backend Queue Management 2029 component is configured to maintain the per-volume backend command queues and to perform the link command to per-volume backend queue, unlink command from per-volume backend queue and begin/end iterator processes described above.

The SV component 2000 including the APIO component 2020 may be provided as software, such as resident in memory for execution by a processing unit (including multi-core professing platforms). It may also be provided as stored on a non-transitory computer readable medium (e.g., a disk) for downloading, uploading, selling, distributing, etc. of the SV component 2000 with the APIO component 2020. A computer apparatus with a processor and memory may also be provided as an execution platform for the SV component 2000 including the APIO component 2020. Examples of a computer apparatus include but are not limited to storage servers, storage area network servers, desktop computers, laptop computers, tablet computers, smartphones, and others.

Thus, methods, articles or manufacture and apparatus for performing parallel IO operations with command list management are provided in accordance with the present invention. Although considerable detail with reference to certain embodiments is provided herein, the invention may be variously embodied without departing from the spirit or scope of the invention. Therefore, the following claims should not be limited to the description of the embodiments contained herein in any way.

The invention claimed is:

1. A method for handling IO requests directed to an operating system having an IO scheduling component, the method comprising:
   allocating a command to a thread in association with one of the IO requests, the command being allocated from one of a plurality of command lists accessible in parallel;
   linking the command to one of a plurality of active command lists that are accessible in parallel;
   returning a success indication to the thread, unlinking the command from the one of the plurality of active command lists, and freeing the command to one of the plurality of command lists following a cache hit corresponding to the one of the IO requests,
   wherein each of the active command lists respectively corresponds to one of a plurality of CPUs on a multi-core processing platform on which the IO requests are processed.

2. The method of claim 1, wherein each of the active command lists includes a cell, a singly linked list, and a doubly linked list.

3. A non-transitory computer readable medium storing program code for handling IO requests directed to an operating system having an IO scheduling component, the program code being executable by a processor to perform operations comprising:
   allocating a command to a thread in association with one of the IO requests, the command being allocated from one of a plurality of command lists accessible in parallel;
   linking the command to one of a plurality of active command lists that are accessible in parallel;
   returning a success indication to the thread, unlinking the command from the one of the plurality of active command lists, and freeing the command to one of the plurality of command lists following a cache hit corresponding to the one of the IO requests,
   wherein each of the active command lists respectively corresponds to one of a plurality of CPUs on a multi-core processing platform on which the IO requests are processed.

4. The computer readable medium of claim 3, wherein each of the active command lists includes a cell, a singly linked list, and a doubly linked list.

5. An apparatus for handling IO requests directed to an operating system having an IO scheduling component, the apparatus comprising:
   a processor; and
   a memory, the memory storing program code executable by the processor to perform operations comprising:
   allocating a command to a thread in association with one of the IO requests, the command being allocated from one of a plurality of command lists accessible in parallel;
   linking the command to one of a plurality of active command lists that are accessible in parallel;
   returning a success indication to the thread, unlinking the command from the one of the plurality of active command lists, and freeing the command to one of the plurality of command lists following a cache hit corresponding to the one of the IO requests,
   wherein each of the active command lists respectively corresponds to one of a plurality of CPUs on a multi-core processing platform on which the IO requests are processed.

6. The apparatus of claim 5, wherein each of the active command lists includes a cell, a singly linked list, and a doubly linked list.

* * * * *